(12) United States Patent
Takiguchi et al.

(10) Patent No.: US 10,254,133 B2
(45) Date of Patent: Apr. 9, 2019

(54) ROTATION ANGLE DETECTOR, ROTATING ELECTRICAL MACHINE, AND ELEVATOR HOISTING MACHINE

(71) Applicant: MITSUBISHI ELECTRIC CORPORATION, Chiyoda-ku (JP)

(72) Inventors: Ryuichi Takiguchi, Chiyoda-ku (JP);
Morishige Minobe, Chiyoda-ku (JP);
Satoru Nakada, Chiyoda-ku (JP);
Shuhei Niikura, Chiyoda-ku (JP);
Naohiro Motoishi, Chiyoda-ku (JP);
Yusuke Morita, Chiyoda-ku (JP);
Takanori Komatsu, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 15/034,030

(22) PCT Filed: Dec. 9, 2013

(86) PCT No.: PCT/JP2013/082980
§ 371 (c)(1),
(2) Date: May 3, 2016

(87) PCT Pub. No.: WO2015/087381
PCT Pub. Date: Jun. 18, 2015

(65) Prior Publication Data
US 2016/0265944 A1    Sep. 15, 2016

(51) Int. Cl.
*H02K 11/225* (2016.01)
*G01D 5/20* (2006.01)
(Continued)

(52) U.S. Cl.
CPC ......... *G01D 5/2046* (2013.01); *B66B 5/0018* (2013.01); *B66B 11/043* (2013.01);
(Continued)

(58) Field of Classification Search
CPC .. H02K 11/215; H02K 11/225; G01D 5/2046; B66B 11/043; B66B 5/0018
See application file for complete search history.

(56) References Cited

U.S. PATENT DOCUMENTS 5,032,750 A * 7/1991 Hayashi ............... G01D 5/2086
310/114
5,329,195 A * 7/1994 Horber .................... H02K 3/28
310/68 B (Continued)

FOREIGN PATENT DOCUMENTS

JP    2007-288961 A    11/2007
JP    2007-322132 A    12/2007
(Continued)

OTHER PUBLICATIONS

International Search Report dated Jan. 14, 2014 in PCT/JP2013/082980 filed Dec. 9, 2013.

*Primary Examiner* — Dang D Le
(74) *Attorney, Agent, or Firm* — Xsensus LLP

(57) ABSTRACT

An excitation winding is wound around each tooth of a detecting stator core. First output winding and second output winding are wound around mutually different teeth while avoiding winding of the output windings with the same phase around two teeth adjacent to each other in a circumferential direction. When the number of pole pairs of the excitation winding is M that is an integer equal to or greater than 1 and the number of salient poles of a detecting rotor is N that is an integer equal to or greater than 1, a spatial distribution of the number of turns in each of the first and second output winding is obtained by a function represented by a sine wave of a spatial order $|M \pm N|$. An error spatial order $\delta$ represented by $|M - |M \pm N||$ and an error spatial order $\varepsilon$ represented by $|\delta - M|$ are values other than 1 and 2.

16 Claims, 22 Drawing Sheets

(51) Int. Cl.
  *H02K 11/215*   (2016.01)
  *B66B 5/00*     (2006.01)
  *B66B 11/04*    (2006.01)
  *H02K 21/16*    (2006.01)

(52) U.S. Cl.
  CPC ......... *H02K 11/215* (2016.01); *H02K 11/225* (2016.01); *H02K 21/16* (2013.01)

(56) References Cited

U.S. PATENT DOCUMENTS

| | | | | |
|---|---|---|---|---|
| 5,446,966 A | * | 9/1995 | Ishizaki | ............... G01D 5/2046 318/605 |
| 2007/0247142 A1 | | 10/2007 | Ijima | |
| 2011/0074400 A1 | * | 3/2011 | Nakano | ................. G01D 5/2046 324/207.25 |
| 2014/0191628 A1 | * | 7/2014 | Nakano | ................. H02K 1/2746 310/68 B |
| 2017/0093242 A1 | * | 3/2017 | Hirotani | .................... H02K 3/28 |
| 2017/0199057 A1 | * | 7/2017 | Morita | ................... H02K 24/00 |
| 2017/0288510 A1 | * | 10/2017 | Takiguchi | ............ H02K 11/225 |
| 2018/0172479 A1 | * | 6/2018 | Kashima | ............. G01D 5/2046 |

FOREIGN PATENT DOCUMENTS

| | | |
|---|---|---|
| JP | 2011-64710 A | 3/2011 |
| JP | 2011-174743 A | 9/2011 |
| JP | 2011-188611 A | 9/2011 |
| WO | 2007/029678 A1 | 3/2007 |
| WO | 2009/145085 A1 | 12/2009 |

* cited by examiner

FIG. 4

| TOOTH NUMBER | 1 | 2 | 3 | 4 | 5 | 6 | 7 | 8 | 9 |
|---|---|---|---|---|---|---|---|---|---|
| EXCITATION WINDING | 40 | −40 | 40 | −40 | 40 | −40 | 40 | −40 | 40 |
| FIRST OUTPUT WINDING (COS WINDING) | 460 | 0 | −230 | 0 | −230 | 0 | 460 | 0 | −230 |
| SECOND OUTPUT WINDING (SIN WINDING) | 0 | 398 | 0 | 0 | 0 | −398 | 0 | 398 | 0 |
| TOOTH NUMBER | 10 | 11 | 12 | 13 | 14 | 15 | 16 | 17 | 18 |
| EXCITATION WINDING | −40 | 40 | −40 | 40 | −40 | 40 | −40 | 40 | −40 |
| FIRST OUTPUT WINDING (COS WINDING) | 0 | −230 | 0 | 460 | 0 | −230 | 0 | −230 | 0 |
| SECOND OUTPUT WINDING (SIN WINDING) | 0 | 0 | −398 | 0 | 398 | 0 | 0 | 0 | −398 |

FIG. 7

| TOOTH NUMBER | AXIAL DOUBLE ANGLE N | NUMBER OF TEETH 2M | EXCITATION WINDING ORDER M | OUTPUT WINDING ORDER $\|M\pm N\|$ | $\delta$ $=\|M-\|M\pm N\|\|$ | $\varepsilon$ $=\|\delta-M\|$ |
|---|---|---|---|---|---|---|
| EXAMPLE 1-1 | 15 | 18 | 9 | 24(6),6 | 15,3 | 6 |
| EXAMPLE 1-2 | 24 | 18 | 9 | 33(3),15(3) | 24,6 | 15,3 |
| EXAMPLE 1-3 | 30 | 18 | 9 | 39(3),21(3) | 30,12 | 21,3 |

FIG. 26

| TOOTH NUMBER | 1 | 2 | 3 | 4 | 5 | 6 | 7 | 8 | 9 | 10 |
|---|---|---|---|---|---|---|---|---|---|---|
| EXCITATION WINDING | 40 | −40 | 40 | −40 | 40 | −40 | 40 | −40 | 40 | −40 |
| FIRST OUTPUT WINDING (COS WINDING) | 380 | 0 | −190 | 0 | −190 | 0 | 380 | 0 | −190 | 0 |
| SECOND OUTPUT WINDING (SIN WINDING) | 0 | 330 | 0 | 0 | 0 | −330 | 0 | 330 | 0 | 0 |
| TOOTH NUMBER | 11 | 12 | 13 | 14 | 15 | 16 | 17 | 18 | 19 | 20 |
| EXCITATION WINDING | 40 | −40 | 40 | −40 | 40 | −40 | 40 | −40 | 40 | −40 |
| FIRST OUTPUT WINDING (COS WINDING) | −190 | 0 | 380 | 0 | −190 | 0 | −190 | 0 | 380 | 0 |
| SECOND OUTPUT WINDING (SIN WINDING) | 0 | −330 | 0 | 330 | 0 | 0 | 0 | −330 | 0 | 330 |
| TOOTH NUMBER | 21 | 22 | 23 | 24 | 25 | 26 | 27 | 28 | 29 | 30 |
| EXCITATION WINDING | 40 | −40 | 40 | −40 | 40 | −40 | 40 | −40 | 40 | −40 |
| FIRST OUTPUT WINDING (COS WINDING) | −190 | 0 | −190 | 0 | 380 | 0 | −190 | 0 | −190 | 0 |
| SECOND OUTPUT WINDING (SIN WINDING) | 0 | 0 | 0 | −330 | 0 | 330 | 0 | 0 | 0 | −330 |

FIG. 27

| TOOTH NUMBER | AXIAL DOUBLE ANGLE N | NUMBER OF TEETH 2M | EXCITATION WINDING ORDER M | OUTPUT WINDING ORDER $|M \pm N|$ | $\delta = |M - |M \pm N||$ | $\varepsilon = |\delta - M|$ |
|---|---|---|---|---|---|---|
| EXAMPLE 8-1 | 20 | 30 | 15 | 35(5),5 | 20,10 | 5 |
| EXAMPLE 8-2 | 10 | 30 | 15 | 25(5),5 | 10 | 5 |
| EXAMPLE 8-3 | 24 | 30 | 15 | 39(9),9 | 24,6 | 9 |

ROTATION ANGLE DETECTOR, ROTATING ELECTRICAL MACHINE, AND ELEVATOR HOISTING MACHINE

TECHNICAL FIELD

The present invention relates to a rotation angle detector including a detecting stator and a detecting rotor that is rotatable with respect to the detecting stator, and to a rotating electrical machine and an elevator hoisting machine.

BACKGROUND ART

There has hitherto been known a rotation angle detector which includes a rotor having three salient poles and a stator surrounding an outer periphery of the rotor, and in which an excitation winding is wound around each of 12 teeth of the stator, and a SIN output winding and a COS output winding are alternately wound around each of the teeth in a circumferential direction of the stator (for example, see Patent Literature 1).

CITATION LIST

Patent Literature

[PTL 1] JP 2007-288961 A

SUMMARY OF INVENTION

Technical Problem

However, in the related-art rotation angle detector disclosed in Patent Literature 1, due to a decrease in spatial order of the excitation winding, the number of slots per order of the excitation winding increases, and a leakage magnetic flux amount between mutually adjacent slots easily increases. With this, an error of a detected angle easily increases in the related-art rotation angle detector.

Further, orders that the SIN output winding and the COS output winding can detect are a first order, a third order, and a fifth order in the related-art rotation angle detector disclosed in Patent Literature 1, and an interval therebetween is a second order. Thus, for example, when deformation of the second order is applied to the stator of the rotation angle detector, an error due to the deformation of the stator may be included in an angle detected by the rotation angle detector. Hence, the error of the detected angle may further increase in the related-art rotation angle detector.

The present invention has been made in order to solve the problem as described above, and it is an object of the present invention to obtain a rotation angle detector, a rotating electrical machine, and an elevator hoisting machine which are capable of suppressing a leakage magnetic flux, and capable of suppressing an increase in detection error.

Solution to Problem

According to one embodiment of the present invention, there is provided a rotation angle detector, including: a detecting stator including a detecting stator core, and a plurality of excitation windings, a first output winding, and a second output winding that are each provided on the detecting stator core; and a detecting rotor including a plurality of salient poles arrayed in a circumferential direction, and being rotatable with respect to the detecting stator, while each of the plurality of salient poles is opposed to the detecting stator in a radial direction, in which: the first output winding and the second output winding are output windings with mutually different phases; the detecting stator core includes a plurality of teeth arrayed in the circumferential direction; each of the plurality of excitation windings is wound around each of the plurality of teeth; the first output winding and the second output winding are wound around the teeth different from each other, while avoiding winding of the output windings with the same phase around two of the plurality of teeth which are adjacent to each other in the circumferential direction; a number of pole pairs of the plurality of excitation windings is M that is an integer equal to or greater than 1; a number of the plurality of salient poles is N that is an integer equal to or greater than 1; a spatial distribution of a number of turns in each of the first output winding and the second output winding is obtained by a function represented by a sine wave of a spatial order $|M \pm N|$; and an error spatial order $\delta$ represented by $|M - |\pm N||$ and an error spatial order $\varepsilon$ represented by $|\delta - M|$ are values other than 1 and 2.

Further, a rotating electrical machine and an elevator hoisting machine according to one embodiment of the present invention include the rotation angle detector with the error spatial orders $\delta$ and $\varepsilon$ being values other than 1 and 2.

Advantageous Effects of Invention

According to the rotation angle detector, the rotating electrical machine, and the elevator hoisting machine of the one embodiment of the present invention, the error spatial orders $\delta$ and $\varepsilon$ are values other than 1 and 2, and hence each output winding can be prevented from picking up error spatial orders of a first order and a second order, to thereby suppress an increase in angle error with respect to noises of eccentricity, elliptical deformation, magnetic anisotropy, and the like of the detecting stator or the detecting rotor, for example. Further, the number M of pole pairs of the excitation winding becomes the spatial order of the excitation winding, and hence the spatial order of the excitation winding can be maximized with respect to the number 2M of teeth, to thereby suppress a leakage magnetic flux.

BRIEF DESCRIPTION OF DRAWINGS

FIG. 4 is a table for showing the number of turns of a conductive wire in each of excitation windings, first output windings, and second output windings of FIG. 3.

FIG. 7 is a table for showing, as Example 1-1, the number of salient poles (axial double angle), the number of teeth, a spatial order of the excitation winding, and a spatial order of each of the first and second output windings in the rotation angle detector of FIG. 3.

FIG. 26 is a table for showing the number of turns of a conductive wire in each of excitation windings, first output windings, and second output windings of FIG. 25.

FIG. 27 is a table for showing, as Example 8-1, the number of salient poles (axial double angle), the number of teeth, a spatial order of the excitation winding, and a spatial order of each of the first and second output windings in the rotation angle detector of FIG. 25.

DESCRIPTION OF EMBODIMENTS

Now, preferred embodiments of the present invention are described with reference to the attached drawings.

First Embodiment

Figure 1:
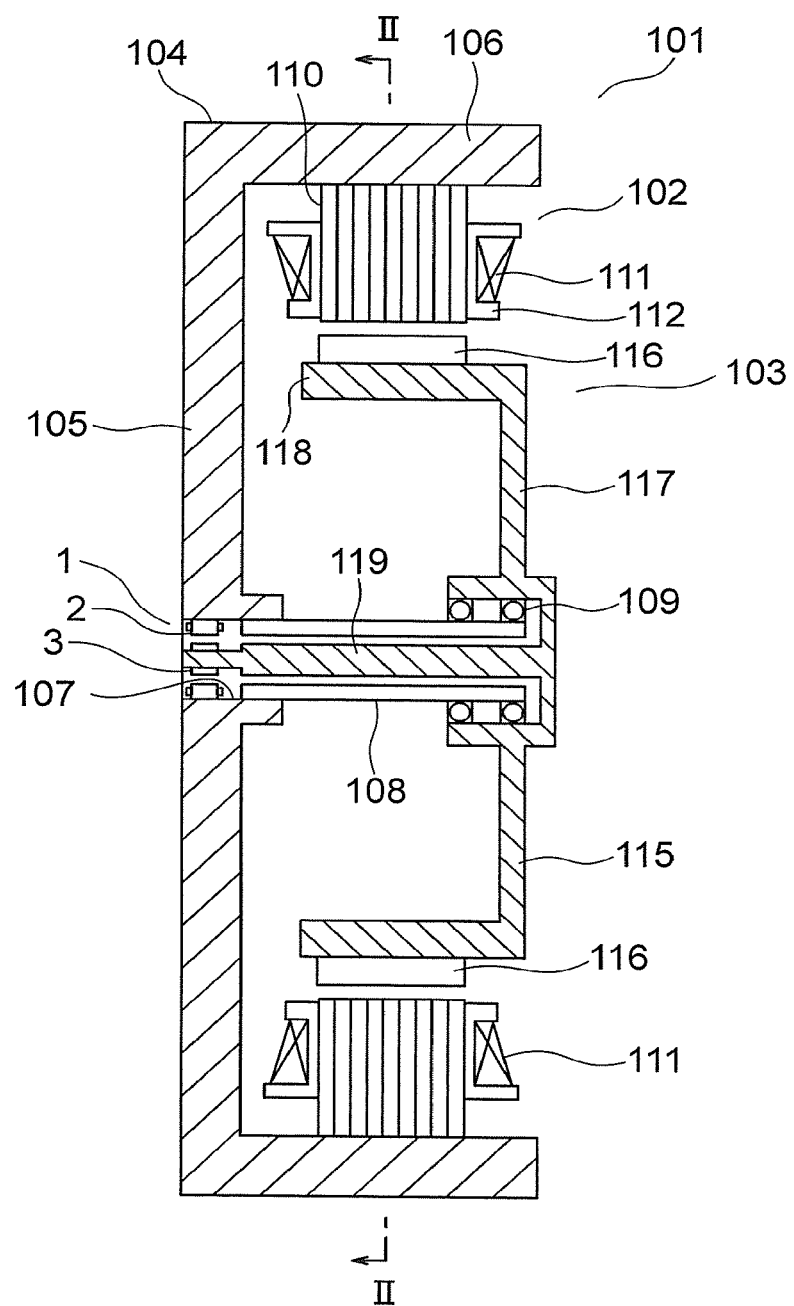
FIG. 1 is a longitudinal sectional view for illustrating a rotating electrical machine according to a first embodiment of the present invention.
Figure 2:
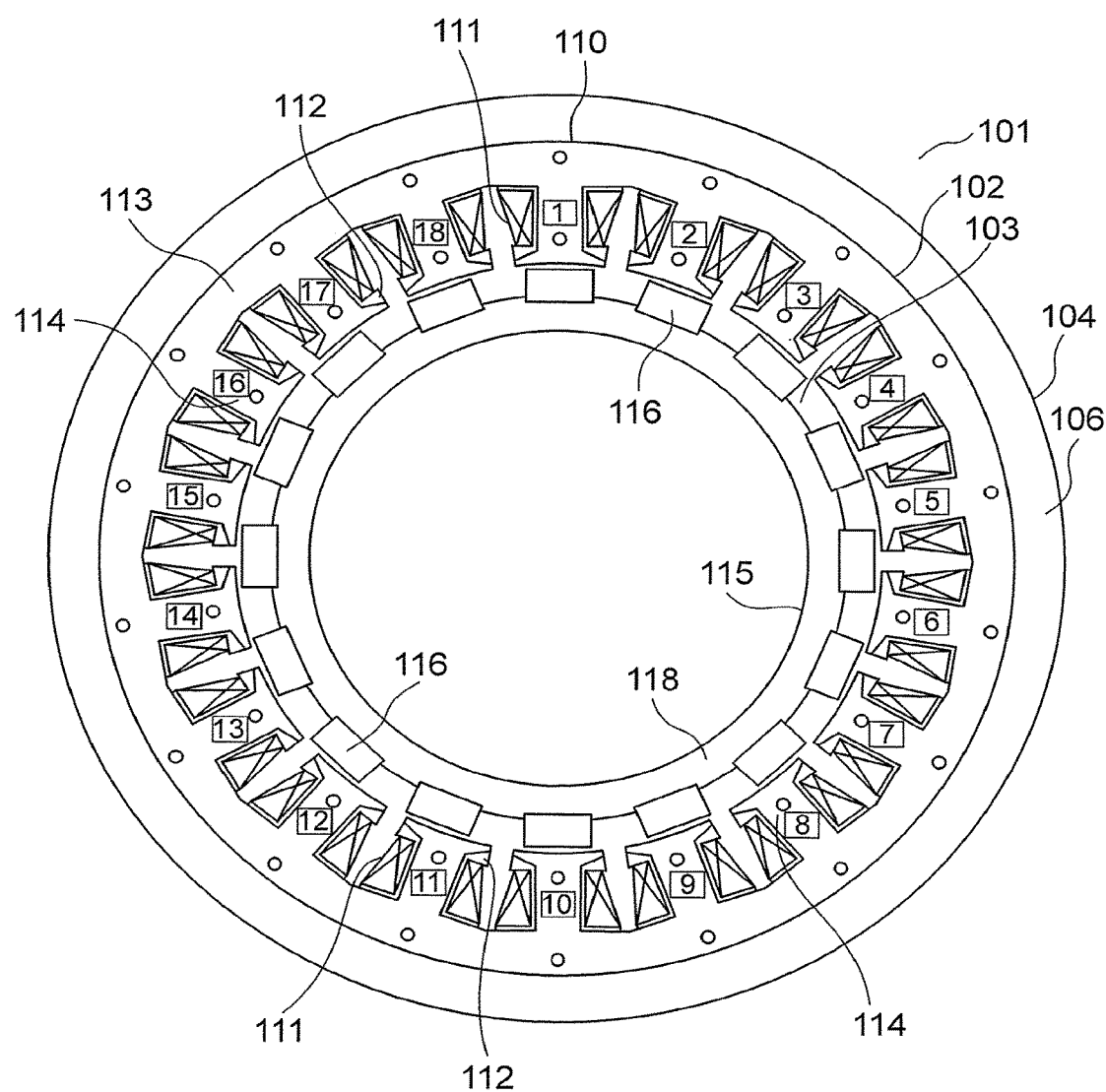
FIG. 2 is a sectional view taken along the line II-II of FIG. 1.

FIG. 1 is a longitudinal sectional view for illustrating a rotating electrical machine according to a first embodiment of the present invention. Further, FIG. 2 is a sectional view taken along the line II-II of FIG. 1. In FIG. 1 and FIG. 2, a rotating electrical machine 101 includes an annular stator 102, a rotor 103 arranged inside the stator 102 and rotatable with respect to the stator 102, and a housing 104 configured to support the stator 102 and the rotor 103.

The housing 104 includes a plate-like housing body 105, and a cylindrical housing cylinder part 106 fixed to an outer peripheral part of the housing body 105. A through hole 107 is formed in a central part of the housing body 105. As illustrated in FIG. 1, the housing 104 has a support shaft 108 fixed thereto, the support shaft 108 being fixed to the housing body 105 and arranged on a central axis line of the housing cylinder part 106. The support shaft 108 is a hollow (cylindrical) shaft, the inside of which is communicated with the through hole 107. The rotor 103 is rotatably mounted to the support shaft 108 through intermediation of a bearing 109. Further, the rotor 103 is supported by the housing 104 through intermediation of the support shaft 108

The stator 102 is arranged coaxially with the rotor 103. Further, the stator 102 includes: an annular stator core 110 surrounding an outer periphery of the rotor 103; a plurality of stator coils 111 each provided on the stator core 110 and arrayed in a circumferential direction of the stator core 110; and an insulator 112 provided on the stator core 110 and interposed between the stator core 110 and each stator coil 111. The stator 102 is supported by the housing 104 under a state in which the stator core 110 is fitted in the housing cylinder part 106. An insulating state between each stator coil 111 and the stator core 110 is ensured by the insulator 112.

The stator core 110 is constructed by a plurality of steel plates (magnetic bodies) laminated in an axial direction of the support shaft 108. Further, the stator core 110 includes an annular back yoke part 113 along the inner peripheral surface of the housing cylinder part 106, and a plurality of magnetic pole tooth portions 114 each projecting radially inward from the back yoke part 113 and arranged as spaced from each other in the circumferential direction of the stator core 110. The magnetic pole tooth portions 114 are each arranged at regular intervals in the circumferential direction of the stator core 110.

The stator coils 111 are individually provided in the respective magnetic pole tooth portions 114. Hence, the stator coils 111 are each arranged at regular intervals in the circumferential direction of the stator core 110. In the stator 102, a rotating magnetic field is generated by power distribution to each stator coil 111. Due to generation of the rotating magnetic field in the stator 102, the rotor 103 is rotated about the axis line of the support shaft 108.

The rotor 103 includes a rotor yoke 115 and a plurality of permanent magnets (rotor magnetic pole portions) 116 each provided on the rotor yoke 115.

The rotor yoke 115 is a casting formed of cast iron. Further, as illustrated in FIG. 1, the rotor yoke 115 includes: a rotor yoke body 117 having the bearing 109 mounted thereto; a cylindrical rotor cylinder part 118 fixed to an outer peripheral part of the rotor yoke body 117 and arranged coaxially with the support shaft 108; and a detector shaft 119 fixed to a central part of the rotor yoke body 117 and reaching the inside of the through hole 107 through the inside of the support shaft 108.

The rotor yoke 115 is arranged inside the stator 102 under a state in which the outer peripheral surface of the rotor cylinder part 118 is opposed to the stator 102 in a radial direction of the rotor 103. With this, the outer peripheral surface of the rotor cylinder part 118 is opposed to the distal surface of each magnetic pole tooth portion 114 in the radial direction.

The permanent magnets 116 are each provided on the outer peripheral surface of the rotor cylinder part 118. Further, the permanent magnets 116 are spaced from each other in a circumferential direction of the rotor 103 (a rotating direction of the rotor 103) in a space between the rotor cylinder part 118 and the stator 102. In this example, the permanent magnets 116 are each arranged at regular intervals in the circumferential direction of the rotor 103.

In the through hole 107 of the housing body 105, a rotation angle detector 1 configured to detect a rotation angle of the rotor 103 is provided. The rotation angle detector 1 includes a detecting stator 2 fixed to the housing body 105 in the through hole 107, and a detecting rotor 3 that is a magnetic body opposed to the detecting stator 2 in the radial direction and rotatable with respect to the detecting stator 2. In this example, the detecting stator 2 has an annular shape, and the detecting rotor 3 is arranged radially inside the detecting stator 2. Further, in this example, the detecting rotor 3 is fixed to the detector shaft 119.

Figure 3:
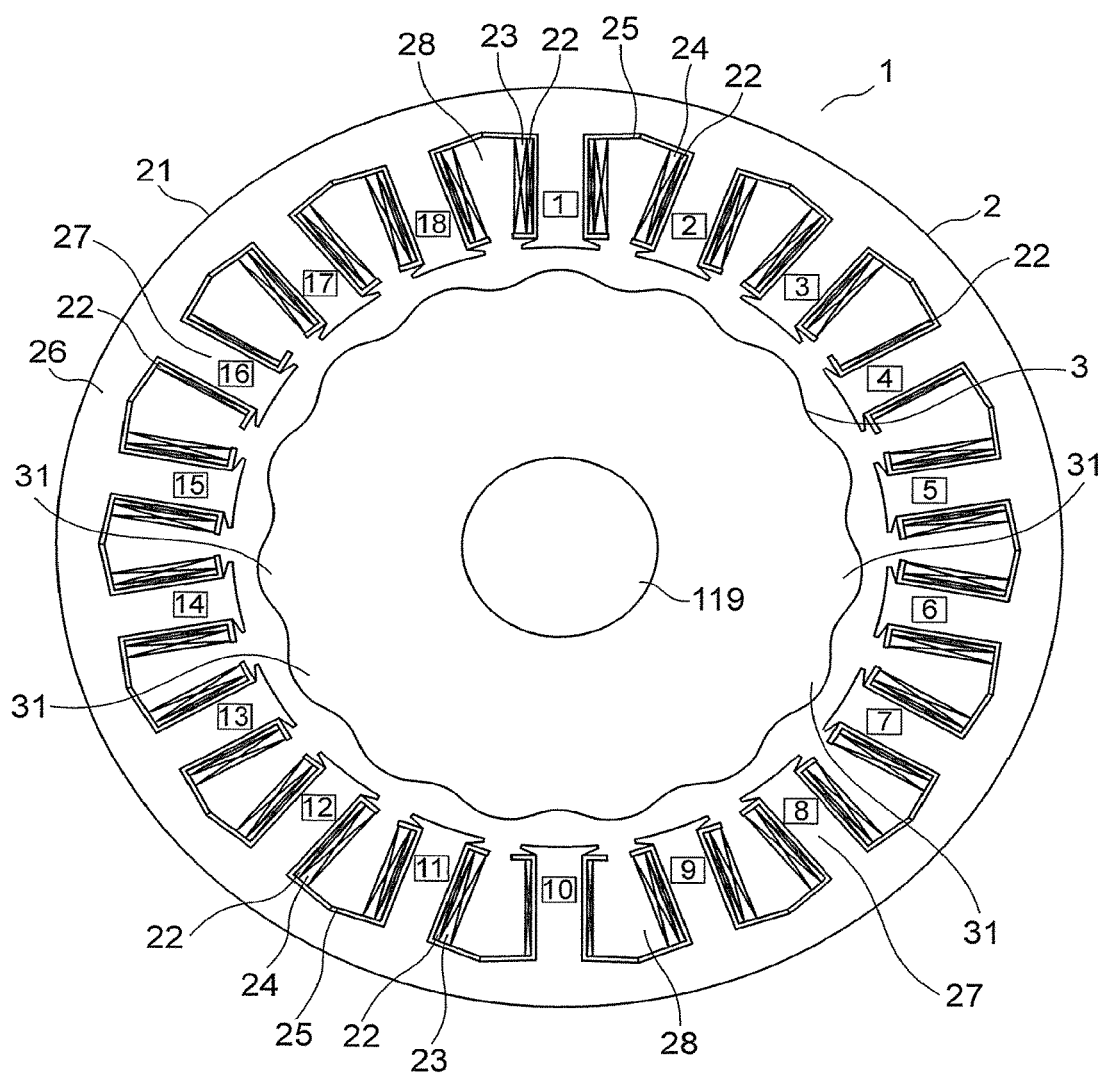
FIG. 3 is a sectional view for illustrating a rotation angle detector of FIG. 1.

FIG. 3 is a sectional view for illustrating the rotation angle detector 1 of FIG. 1. The detecting stator 2 includes: a detecting stator core 21 that is a magnetic body; a plurality of excitation windings 22, a plurality of first output windings 23, and a plurality of second output windings 24 that are each provided on the detecting stator core 21; and an insulating body 25 provided on the detecting stator core 21 and interposed between the detecting stator core 21 and each of the excitation windings 22, the first output windings 23, and the second output windings 24. An insulating state between the detecting stator core 21 and each of the excitation windings 22, the first output windings 23, and the second output windings 24 is ensured by the insulating body 25.

The detecting stator core 21 includes an annular core back 26 and a plurality of teeth 27 each projecting radially inward from the core back 26 and arrayed in a circumferential direction of the detecting stator core 21. In this example, eighteen teeth 27 are arrayed at regular intervals in the circumferential direction of the detecting stator core 21. A slot 28 is formed between adjacent teeth 27, the slot 28 having the excitation winding 22 and at least one of the first output winding 23 or the second output winding 24 arranged therein.

The excitation winding 22 is wound around each tooth 27. The respective excitation windings 22 are electrically connected in series to each other.

The first output winding (COS winding) 23 and the second output winding (SIN winding) 24 are output windings with mutually different phases. The respective first output windings 23 are electrically connected in series to each other, and the respective second output windings 24 are also electrically connected in series to each other. Further, the first output winding 23 and the second output winding 24 are wound around mutually different teeth 27, while avoiding winding of the output windings 23 and 24 with the same phase around two teeth 27 adjacent to each other in the circumferential direction of the detecting stator core 21. In this example, the first output windings 23 are respectively wound around a plurality of teeth 27 alternately selected in the circumferential direction out of the plurality of teeth 27, and the second output windings 24 are respectively wound around a plurality of teeth 27 different from the teeth 27 having the first output windings 23 wound therearound. Further, in this example, the first and second output windings 23 and 24 are respectively wound around the teeth 27 under a state in which the first output winding 23 covers an outer periphery of the excitation winding 22 and the second output winding 24 also covers the outer periphery of the excitation winding 22.

A central part of the detecting rotor 3 is fitted onto (fixed to) the detector shaft 119. With this, the detecting rotor 3 is rotated integrally with the detector shaft 119 about an axis line of the detector shaft 119.

The detecting rotor 3 includes a plurality of salient poles 31 arrayed in a circumferential direction of the detecting rotor 3. Further, the detecting rotor 3 is rotatable with respect to the detecting stator 2, while each salient pole 31 is opposed to the inner peripheral surface of the detecting stator 2 in the radial direction. When the detecting rotor 3 is rotated with respect to the detecting stator 2, a pulsation of permeance between the detecting rotor 3 and the detecting stator 2 changes in a sine-wave shape due to existence of each salient pole 31.

AC power is supplied to each excitation winding 22, to thereby generate magnetomotive force in each excitation winding 22. With this, a magnetic flux passing through the detecting rotor 3 and the detecting stator core 21 is generated. This magnetic flux interlinks the first and second output windings 23 and 24, to thereby generate a voltage in each of the first and second output windings 23 and 24. The permeance between the detecting rotor 3 and the detecting stator 2 changes in the sine-wave shape in accordance with the rotation angle of the detecting rotor 3, and hence the rotation angle of the detecting rotor 3 is detected by measuring a voltage output from each of the first output winding 23 and the second output winding 24.

FIG. 4 is a table for showing the number of turns of the conductive wire in each of the excitation windings 22, the first output windings 23, and the second output windings 24 of FIG. 3. Note that, tooth numbers shown in FIG. 4 are numbers conveniently allocated to the respective teeth 27 of FIG. 3 and are sequential in the circumferential direction (numbers surrounded by quadrangular frames in FIG. 3). Further, a number under the tooth number of FIG. 4 is the number of turns of the conductive wire wound around the tooth 27 corresponding to the tooth number. Moreover, a positive number and a negative number in the numbers of turns in FIG. 4 represent that winding directions of the conductive wires are opposite to each other.

The conductive wire of the excitation winding 22 is wound 40 times around every tooth 27 such that the respective winding directions of the mutually adjacent teeth 27 are opposite to each other.

The conductive wire of the first output winding 23 is wound 460 times around each of the teeth 27 with the tooth numbers 1, 7, and 13, and is wound 230 times around each of the teeth 27 with the tooth numbers 3, 5, 9, 11, 15, and 17. The conductive wire of the first output winding 23 wound around each of the teeth 27 with the tooth numbers 1, 7, and 13 is wound in the same direction. The conductive wire of the first output winding 23 wound around each of the teeth 27 with the tooth numbers 3, 5, 9, 11, 15, and 17 is wound in the opposite direction to the winding direction of the conductive wire of the first output winding 23 wound around each of the teeth 27 with the tooth numbers 1, 7, and 13.

The conductive wire of the second output winding 24 is wound 398 times around each of the teeth 27 with the tooth numbers 2, 6, 8, 12, 14, and 18. The conductive wire of the second output winding 24 wound around each of the teeth 27 with the tooth numbers 2, 8, and 14 is wound in the same direction as the winding direction of the conductive wire of the first output winding 23 wound around each of the teeth 27 with the tooth numbers 1, 7, and 13. Further, the conductive wire of the second output winding 24 wound around each of the teeth 27 with the tooth numbers 6, 12, and 18 is wound in the opposite direction to the winding direction of the conductive wire of the second output winding 24 wound around each of the teeth 27 with the tooth numbers 2, 8, and 14. The first and second output windings 23 and 24 are not wound around each of the teeth 27 with the tooth numbers 4, 10, and 16 in order to distribute the output windings in the sine-wave shape.

The respective spatial distributions of the numbers of turns in the first output winding 23 and the second output winding 24 are represented by the following expressions in a case where: the number of pole pairs of the excitation winding 22 is M (M is an integer equal to or greater than 1) when the number of teeth 27 of the detecting stator core 21 is 2M; the number of salient poles 31 (namely, axial double angle) of the detecting rotor 3 is N (N is an integer equal to or greater than 1); the respective numbers of turns in the first output winding 23 and the second output winding 24 on each tooth 27 are $w_{sin,\,i}$ and $w_{cos,\,i}$ (i is 1, 2, . . . 2M); and the respective maximum numbers of turns in the first output winding 23 and the second output winding 24 per tooth 27 are $w_{max}$. In this case, each of double signs in Expression (1) to Expression (6) is in the same order.

[Math. 1]

$$w_{cos,i} = \frac{1}{2}\left\{w_{max}\cos\left[\frac{2\pi i(i+1)}{2M}|M \pm N|\right] + w_{max}\cos\left[\frac{2\pi i(i+1)}{2M}(M - |M \pm N|)\right]\right\}, \quad (1)$$

$(i = 1, 2, \ldots, 2M, \text{double sign in the same order})$ \quad (2)

$$= \begin{cases} w_{max}\cos\left[\dfrac{2\pi i(i+1)}{2M}|M \pm N|\right], & (i = 1, 3, \ldots, 2M - 1, \text{double sign in the same order}) \\ 0, & (i = 2, 4, \ldots, 2M) \end{cases} \quad (3)$$

[Math. 2]

$$w_{sin,i} = \frac{1}{2}\left\{w_{max}\sin\left[\frac{2\pi i(i+1)}{2M}|M \pm N|\right] + w_{max}\sin\left[\frac{2\pi i(i+1)}{2M}(M - |M \pm N|)\right]\right\}, \quad (4)$$

$(i = 1, 2, \ldots, 2M, \text{double sign in the same order})$ \quad (5)

$$= \begin{cases} 0, & (i = 1, 3, \ldots, 2M - 1,) \\ w_{max}\sin\left[\dfrac{2\pi i(i+1)}{2M}|M \pm N|\right], & (i = 1, 4, \ldots, 2M, \text{double sign in the same order}) \end{cases} \quad (6)$$

It is found from Expression (1) to Expression (6) that the first output windings (COS windings) 23 and the second output windings (SIN windings) 24 are alternately wound, with one phase at a time, around the respective teeth 27, and the number of turns in each of the first and second output windings 23 and 24 is obtained by a function represented by a sine wave of a spatial order |M±N|. Further, it is found from Expression (1) and Expression (4) that the spatial distribution of the number of turns in each of the first output winding 23 and the second output winding 24 includes a function represented by a sine wave of a spatial order |M−|M±N||.

Figure 5:
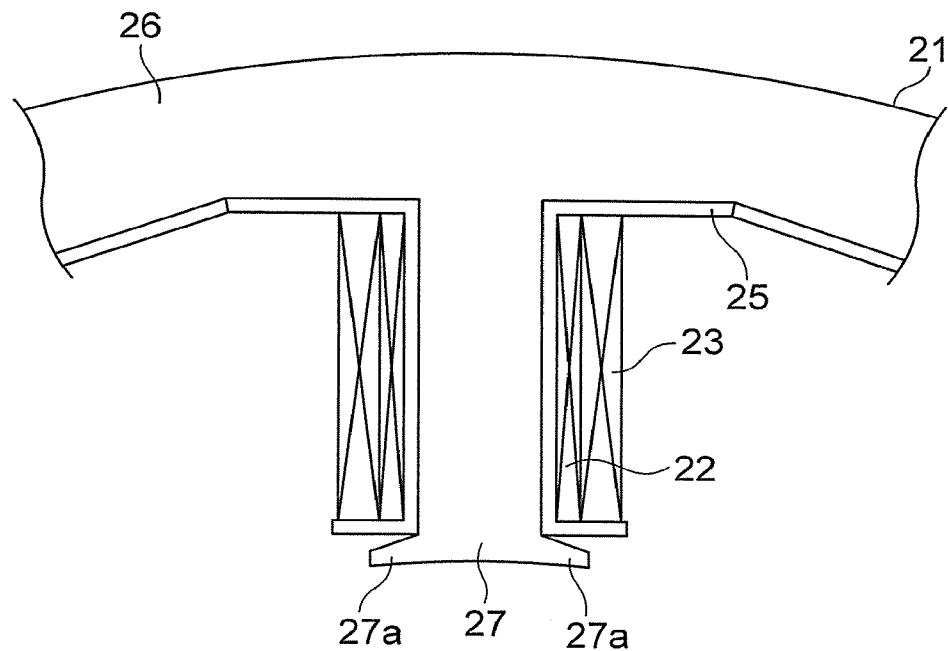
FIG. 5 is an enlarged view for illustrating the excitation winding and the first output winding which are wound around a tooth with a tooth number 1 of FIG. 3.

FIG. 5 is an enlarged view for illustrating the excitation winding 22 and the first output winding 23 that are wound around the tooth 27 with the tooth number 1 of FIG. 3. A pair of projections 27a that project in mutually opposite directions along the circumferential direction of the detecting rotor 3 is provided at the distal end of each tooth 27. The conductive wire of each of the excitation winding 22 and the first output winding 23 is wound around the tooth 27 through intermediation of the insulating body 25 in a range between the projection 27a and the core back 26. With this, a magnetic flux passing between the detecting rotor 3 and the tooth 27 efficiently passes through the detecting stator core 21, to thereby increase a magnetic flux interlinked to the first output winding 23, and increase a value of an output voltage of the first output winding 23.

The excitation winding 22 is provided along the tooth 27 over the range between the projection 27a and the core back 26. The first output winding 23 is provided on the tooth 27 while covering the outer periphery of the excitation winding 22. That is, the excitation winding 22 and the first output winding 23 wound around the outer periphery of the excitation winding 22 are provided on the tooth 27.

Similarly, the first output winding 23 provided on another tooth 27 is also wound around the outer periphery of the excitation winding 22. Further, similarly, each second output winding 24 provided on the tooth 27 is also wound around the outer periphery of the excitation winding 22. That is, the conductive wire of each of the first output winding 23 and the second output winding 24 is wound around the tooth 27 so as to cover the excitation winding 22 together with the tooth 27 after winding of the conductive wire of the excitation winding 22 around the tooth 27.

Figure 6:
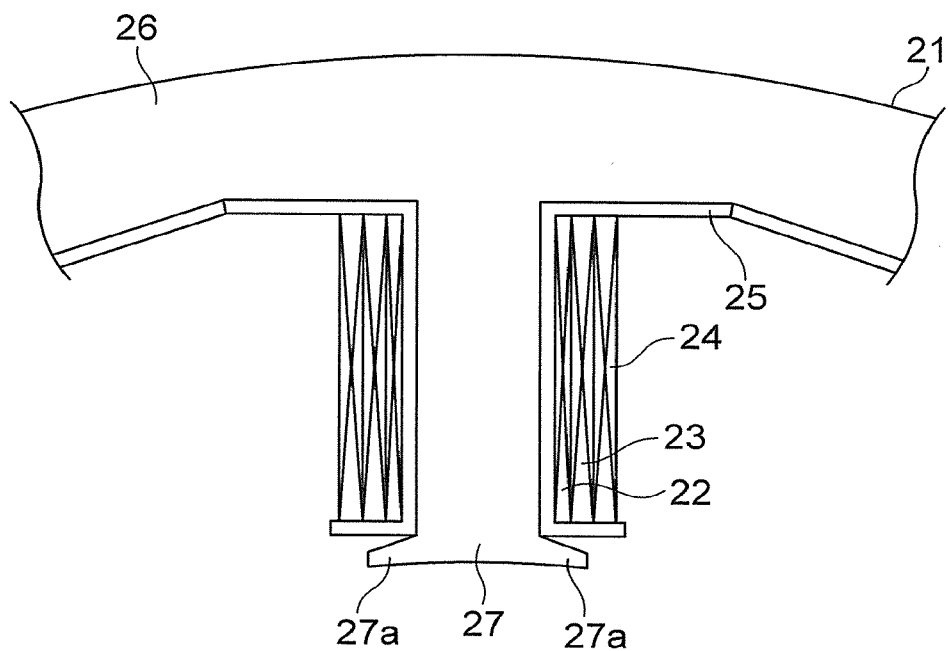
FIG. 6 is a configuration view for illustrating a main part of a comparative example to be compared with the rotation angle detector according to the first embodiment of the present invention.

FIG. 6 is a configuration view for illustrating a main part of a comparative example to be compared with the rotation angle detector 1 according to the first embodiment of the present invention. In the comparative example, each of the excitation winding 22, the first output winding 23, and the second output winding 24 is wound around the tooth 27. Further, in the comparative example, the excitation winding 22 is provided along the tooth 27 over the range between the projection 27a and the core back 26. Moreover, in the comparative example, the conductive wire of the first output winding 23 is wound around the outer periphery of the excitation winding 22, and the conductive wire of the second output winding 24 is wound around the outer periphery of the first output winding 23. That is, in the comparative example, after winding of the conductive wire of the excitation winding 22 around the tooth 27, the conductive wire of the first output winding 23 is wound around the outer periphery of the excitation winding 22, and after winding of the conductive wire of the first output winding 23, the conductive wire of the second output winding 24 is wound around the outer periphery of the first output winding 23.

When the first embodiment and the comparative example are compared to each other, it is found that only any one of the first and second output windings 23 and 24 is provided on one tooth 27 in the first embodiment, whereas both the first and second output windings 23 and 24 are provided on one tooth 27 in the comparative example. It is thereby found that in the first embodiment, the number of turns of the conductive wire in each of the first and second output windings 23 and 24 provided on the tooth 27 can be increased as compared to that in the comparative example. Further, it is found that in the first embodiment, the number of windings provided on one tooth 27 can be reduced, thereby being capable of reducing labor of operation to provide the excitation winding 22, the first output winding 23, and the second output winding 24 on the detecting stator core 21. Moreover, it is found that in the comparative example, winding disorder easily occurs due to existence of a winding start and a winding end of the conductive wire in each of the first and second output windings 23 and 24, whereas in the first embodiment, the winding disorder hardly occurs due to existence of the winding start and the winding end only in any one of the first and second output windings 23 and 24.

Figure 8:
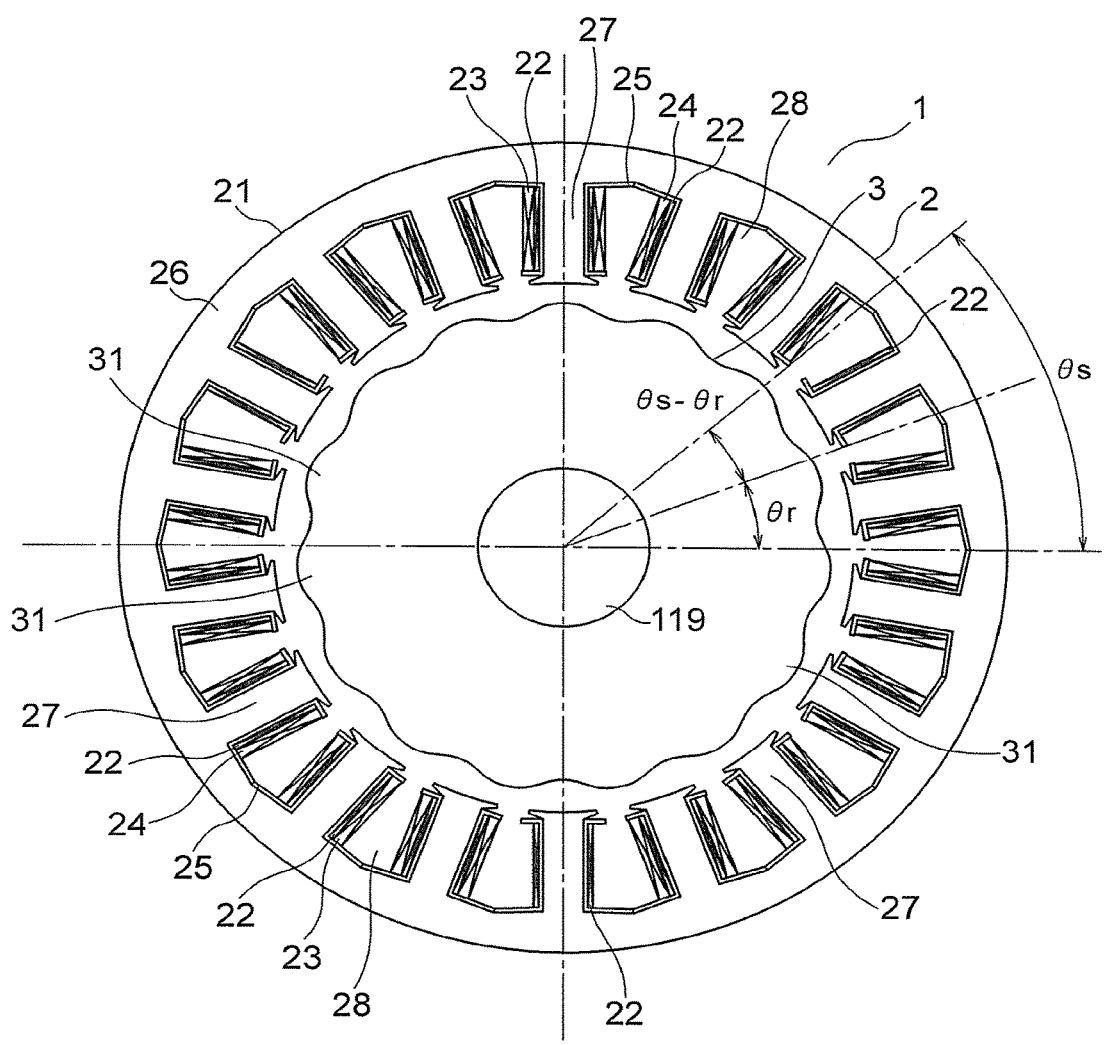
FIG. 8 is a configuration view for illustrating a coordinate relationship between an angle $\theta_s$ of a detecting stator and a rotation angle $\theta_r$ of a detecting rotor in the rotation angle detector of FIG. 3.

FIG. 7 is a table for showing, as Example 1-1, the number of salient poles 31 (axial double angle), the number of teeth 27, a spatial order of the excitation winding 22, and a spatial order of each of the first and second output windings 23 and 24 in the rotation angle detector 1 of FIG. 3. Further, FIG. 8 is a configuration view for illustrating a coordinate relationship between an angle $\theta_s$ of the detecting stator 2 and a rotation angle $\theta_r$ of the detecting rotor 3 in the rotation angle detector 1 of FIG. 3. Note that, in FIG. 7, not only as Example 1-1, but also as Examples 1-2 and 1-3 in which the number of salient poles 31 (axial double angle) has been changed in the first embodiment, the number of teeth 27, a spatial order of the excitation winding 22, and a spatial order of each of the first and second output windings 23 and 24 are shown.

A magnetic flux density $B_g(\theta_s)$ is represented by the following expressions in a case where: a magnetic flux density in a gap (clearance) between the detecting stator 2 and the detecting rotor 3 is $B_g(\theta_s)$; magnetomotive force of the excitation winding 22 is $F(\theta_s)$; permeance showing the easiness for a magnetic flux to pass through the gap between the detecting stator 2 and the detecting rotor 3 is $P(\theta_s)$; a permeance component not dependent on an angle is $P_0$; an amplitude of the permeance component that fluctuates in accordance with the axial double angle of the detecting rotor 3 is $P_N$; an amplitude and a spatial order of the permeance component that fluctuate in accordance with an error of the detecting rotor 3 other than the axial double angle are respectively $P_r$ and r; an amplitude and a spatial order of the permeance component that fluctuate in accordance with an error of the detecting stator 2 are respectively $P_s$ and s; and an amplitude of the magnetomotive force of the excitation winding 22 is $F_M$.

[Math. 3]
$$P(\theta_s) = P_0 + P_N \cos[N(\theta_s - \theta_r)] + P_r \cos[r(\theta_s - \theta_r)] + P_s \cos[s\theta_s] \quad (7)$$

[Math. 4]
$$F(\theta_s) = F_M \cos[M\theta_s] \quad (8)$$

[Math. 5]
$$B_g(\theta_s) = P(\theta_s)F(\theta_s) \quad (9)$$
$$= \left\{ \begin{array}{l} P_0 + P_N \cos[N(\theta_s - \theta_r)] + \\ P_r \cos[r(\theta_s - \theta_r)] + P_s \cos[s\theta_s] \end{array} \right\} F_M \cos[M\theta_s]$$
$$= \frac{F_M}{2} \left\{ \begin{array}{l} 2P_0 \cos[M\theta_s] + \\ P_N \cos[(M+N)\theta_s - N\theta_r] + \\ P_N \cos[(M-N)\theta_s - N\theta_r] \\ P_r \cos[(M+r)\theta_s - r\theta_r] + \\ P_r \cos[(M-r)\theta_s + r\theta_r] + \\ P_s \cos[(M+s)\theta_s] + \\ P_s \cos[(M-s)\theta_s] \end{array} \right\} \quad (10)$$

Further, an angle error $e(\theta r)$ of the rotation angle detector 1 is represented by the following expressions in a case where: an interlinkage magnetic flux per number of turns, which is detected by each of the first output winding 23 and the second output winding 24 on the i-th tooth 27, is $\phi_i$; a length of the detecting stator core 21 in the axial direction is L; a radius of the inner peripheral surface of the detecting stator core 21 is R; a voltage detected by the first output winding 23 is $V_{cos}$; and a voltage detected by the second output winding 24 is $V_{sin}$.

[Math. 6]
$$\phi_i = \int_{\frac{(2i-1)\pi}{2M}}^{\frac{(2i+1)\pi}{2M}} B_g(\theta_s) LR \, d\theta_s, \, (i = 1, 2, \ldots, 2M) \quad (11)$$

[Math. 7]
$$V_{cos} = \frac{d\phi_{cos}}{dt} = \frac{d}{dt}(w_{cos,1}\phi_1 + w_{cos,3}\phi_3 + \ldots + w_{cos,2M-1}\phi_{2M-1}) \quad (12)$$

[Math. 8]
$$V_{sin} = \frac{d\phi_{sin}}{dt} = \frac{d}{dt}(w_{sin,2}\phi_2 + w_{sin,4}\phi_4 + \ldots + w_{sin,2M}\phi_{2M}) \quad (13)$$

[Math. 9]
$$e(\theta_r) = \theta_r - \tan^{-1}\left(\frac{V_{sin}}{V_{cos}}\right) \quad (14)$$

The spatial distributions of the numbers of turns of the first and second output windings 23 and 24 are obtained by the function represented by the sine wave of the spatial order |M±N| as expressed in Expression (1) to Expression (6), and hence when Expression (10) is multiplied by Expression (2) and Expression (6) to perform integration by the angle $\theta_s$ of the detecting stator 2 for each tooth 27 as in Expression (11), a coefficient of the rotation angle $\theta_r$ of the detecting rotor 3 which is included in a phase component of the COS function with a coefficient of the rotation angle $\theta_r$ being equal to $|M\pm N|$ becomes an order of a waveform in one rotation of the detecting rotor 3 with the interlinkage magnetic flux φi per number of turns which is detected by each of the first and second output windings 23 and 24.

Further, the angle error $e(\theta_r)$ is obtained from Expression (14), and hence when only phase components of a second term and a third term are detected in Expression (10), the coefficient of $\theta_r$ in Expression (14) becomes 0, and an angle error does not occur.

On the other hand, when the coefficient of the angle $\theta_s$ of the detecting stator 2 which is included in phase components of a first term, a fourth term, a fifth term, a sixth term, and a seventh term, other than the phase components of the second term and the third term, in Expression (10) is equal to $|M\pm N|$, the first output winding 23 and the second output winding 24 detect the phase components of the first term, the fourth term, the fifth term, the sixth term, and the seventh term, and the coefficient of $\theta_r$ becomes a number being not 0 in accordance with Expression (14), to cause occurrence of an angle error. Further, the spatial distribution of the number of turns in each of the first and second output windings 23 and 24 includes the function represented by the sine wave of the spatial order $|M-|M\pm N||$ in accordance with Expression (1) and Expression (4), and hence an angle error occurs in accordance with Expression (14) similarly to the above when the coefficient of the angle $\theta_s$ of the detecting stator 2 which is included in the phase components of the first term, the fourth term, the fifth term, the sixth term, and the seventh term is equal to $|M-|M\pm N||$.

Therefore, it is necessary to set the number M of pole pairs of the excitation winding 22 and the number N of salient poles 31 (axial double angle) of the detecting rotor 3 such that both the order $|M\pm N|$ and the order $|M-|M\pm N||$ included in the first output winding 23 and the second output winding 24 do not lead to detection of a phase component to cause an error.

In this case, when error spatial orders corresponding to the coefficient r or s of the angle $\theta_s$ of the detecting stator 2 which is included in the phase components of the fourth term, the fifth term, the sixth term, and the seventh term in Expression (10) are taken as "$\delta=|M-|M\pm N||$" and "$\varepsilon=|\delta-M|=||M-|M\pm N||-M|$", the error spatial order $\delta$ becomes a spatial order picked up by a first term in each of Expression (1) and Expression (4), and the error spatial order $\varepsilon$ becomes a spatial order picked up by a second term in each of Expression (1) and Expression (4).

When the error spatial orders $\delta$ and $\varepsilon$ have the values in the above expressions, the angle error $e(\theta_r)$ of the rotation angle detector increases due to generation of an angle error order such as r, s, N±r, or N±s in accordance with Expression (14). Therefore, it is possible to suppress an increase in angle error by setting the number M of pole pairs of the excitation winding 22 (namely, the number 2M of teeth 27 of the detecting stator 2) and the number N of salient poles 31 (namely, axial double angle) of the detecting rotor 3 so as to prevent the error spatial orders $\delta$ and $\varepsilon$ from becoming spatial orders of noises supposed in using the rotation angle detector 1.

In Example 1-1, in FIG. 7, the axial double angle N is 15, the spatial order M of the excitation winding 22 (namely, the number corresponding to half the number of teeth 27) is 9, and the spatial order $|M\pm N|$ of the first and second output windings 23 and 24 is 24 or 6 (note that, 24 is equivalent to 6 because "|18−24|=6" is satisfied). Therefore, in Example 1-1, the error spatial order $\delta=|M-|M\pm N||$ detected by each of the first and second output windings 23 and 24 is 15 and 3, and the error spatial order $\varepsilon=|\delta-M|$ to detect the spatial order $\delta$ is 6. That is, in Example 1-1, the error spatial orders $\delta$ and $\varepsilon$ are set to values other than 1, 2 and 4.

In Example 1-1, the error spatial order $\delta$ is 15 and 3 and the error spatial order $\varepsilon$ to detect the spatial order $\delta$ is 6, and hence the first and second output windings 23 and 24 do not pick up the error spatial orders of the first, second, and fourth orders that are low order components of the error spatial orders. In this case, as the error spatial order of the first order, for example, eccentricity or the like of the detecting stator 2 or the detecting rotor 3 is considered, and as the error spatial order of the second order, for example, elliptical deformation, magnetic anisotropy, a combination of those, or the like of the detecting stator 2 or the detecting rotor 3 is considered. Further, as the error spatial order of the fourth order, for example, quadrangular deformation, magnetic anisotropy, a combination of those, or the like of the detecting stator 2 or the detecting rotor 3 is considered. In Example 1-1, the first and second output windings 23 and 24 do not pick up the error components of the first, second, and fourth orders, thereby being capable of reducing the angle error of the rotation angle detector 1 with respect to noises of eccentricity, elliptical deformation, quadrangular deformation, magnetic anisotropy, and the like of the detecting stator 2 or the detecting rotor 3.

Further, in Example 1-2 of FIG. 7, the axial double angle N is 24, the spatial order M of the excitation winding 22 is 9, and the spatial order $|M\pm N|$ of the first and second output windings 23 and 24 is 33 or 15 (note that, both 33 and 15 are equivalent to 3). Therefore, in Example 1-2, the error spatial order $\delta=|M-|M\pm N||$ detected by each of the first and second output windings 23 and 24 is 24 and 6, and the error spatial order $\varepsilon=|\delta-M|$ to detect the spatial order $\delta$ is 15 and 3. That is, also in Example 1-2, the error spatial orders $\delta$ and $\varepsilon$ are set to values other than 1, 2 and 4.

Also in Example 1-2, similarly to Example 1-1, the first and second output windings 23 and 24 do not pick up the error components of the first, second, and fourth orders, thereby being capable of reducing angle error of the rotation angle detector 1 with respect to noises of eccentricity, elliptical deformation, quadrangular deformation, magnetic anisotropy, and the like of the detecting stator 2 or the detecting rotor 3.

Moreover, in Example 1-3 of FIG. 7, the axial double angle N is 30, the spatial order M of the excitation winding 22 is 9, and the spatial order $|M\pm N|$ of the first and second output windings 23 and 24 is 39 or 21 (note that, both 39 and 21 are equivalent to 3). Therefore, in Example 1-3, the error spatial order $\delta=|M-|M\pm N||$ detected by each of the first and second output windings 23 and 24 is 30 and 12, and the error spatial order $\varepsilon=|\delta-M|$ to detect the spatial order $\delta$ is 21 and 3. That is, also in Example 1-3, the error spatial orders $\delta$ and $\varepsilon$ are set to values other than 1, 2 and 4.

Also in Example 1-3, similarly to Example 1-1, the first and second output windings 23 and 24 do not pick up the error components of the first, second, and fourth orders, thereby being capable of reducing angle error of the rotation angle detector 1 with respect to noises of eccentricity, elliptical deformation, quadrangular deformation, magnetic anisotropy, and the like of the detecting stator 2 or the detecting rotor 3.

In the rotation angle detector 1 as thus described, when the number of pole pairs of the excitation winding 22 is M and the number of salient poles 31 (axial double angle) of the detecting rotor 3 is N, the spatial distribution of the number of turns in each of the first and second output windings 23 and 24 is obtained by the function represented by the sine wave of the spatial order |M±N|, and the error spatial order δ represented by |M−|M±N|| and the error spatial order ε represented by |δ−M| are values other than 1 and 2. Thus, it is possible to prevent the first and second output windings 23 and 24 from detecting the respective error components of the first and second orders. Accordingly, the angle error of the rotation angle detector 1 can be reduced with respect to noises of eccentricity, elliptical deformation, magnetic anisotropy, and the like of the detecting stator 2 or the detecting rotor 3, to thereby suppress an increase in detection error. Further, the excitation winding 22 is wound around every tooth 27, and hence it is possible to maximize the spatial order (number of pole pairs) M of the excitation winding 22 with respect to the number (namely, 2M) of teeth 27 of the detecting stator 2. With this, leakage of the magnetic flux, which is generated by the magnetomotive force of the excitation winding 22, between the teeth 27 can be suppressed, to thereby improve output of the rotation angle detector 1. Accordingly, in the rotating electrical machine 101 using the rotation angle detector 1, it is possible to increase the accuracy in terms of controlling the position and speed of the rotor 103.

Further, the error spatial orders δ and ε are values other than 4 as well as other than 1 and 2, and hence the angle error of the rotation angle detector 1 can also be reduced with respect to a noise of quadrangular deformation in addition to those of eccentricity, elliptical deformation, magnetic anisotropy, and the like of the detecting stator 2 or the detecting rotor 3.

Further, the pair of projections 27a projecting along the circumferential direction of the detecting rotor 3 is provided at the distal end of the tooth 27, and hence a magnetic flux interlinked to each of the first and second output windings 23 and 24 increases, thereby being capable of increasing the value of the output voltage of each of the first and second output windings 23 and 24, without increasing a value of a current flowing through the excitation winding 22.

Figure 9:
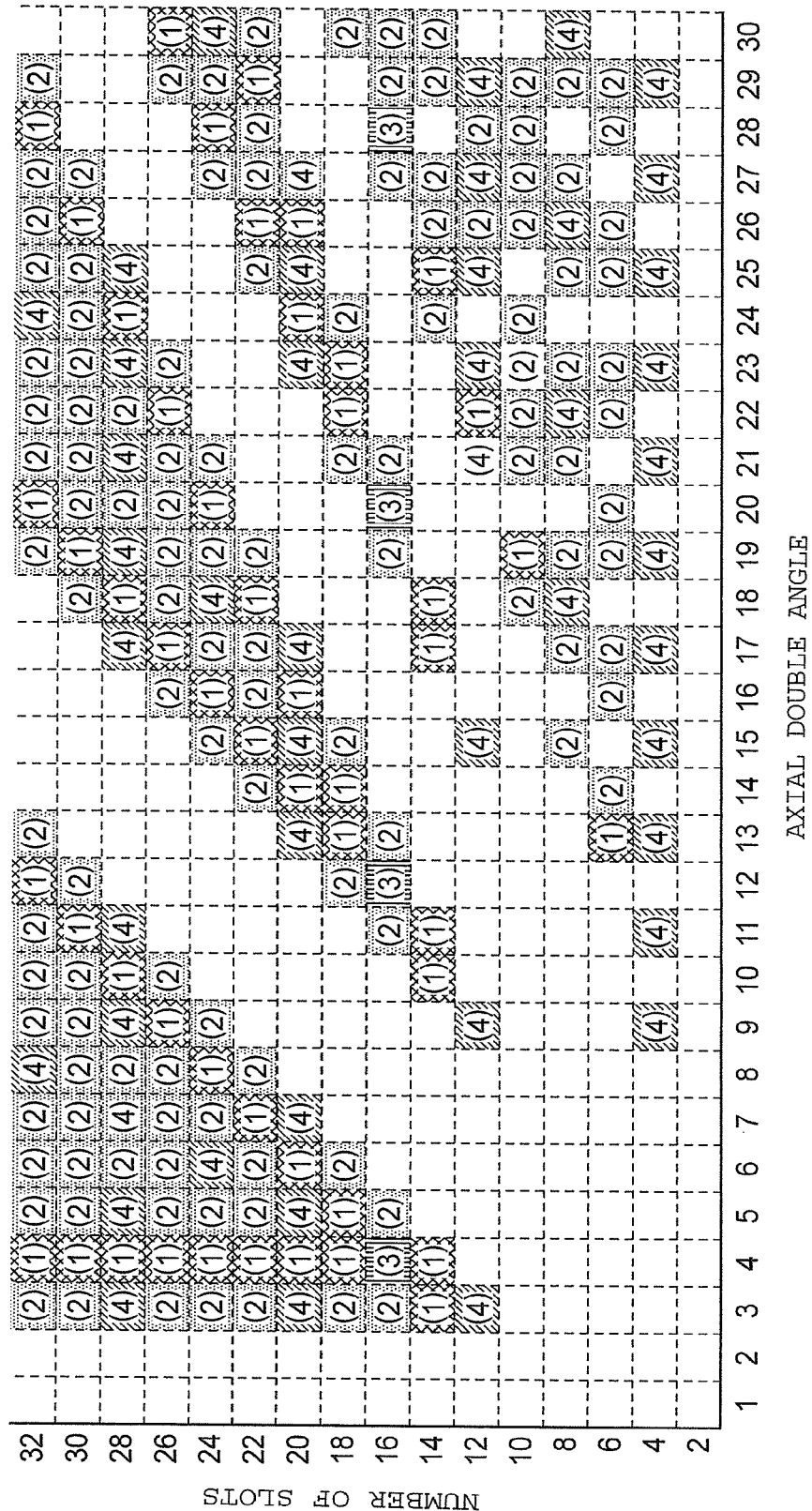
FIG. 9 is a graph for showing combinations of the axial double angle and the number of slots in the first embodiment of the present invention.

FIG. 9 is a graph for showing combinations of the axial double angle and the number of slots in the first embodiment of the present invention. In FIG. 9, the combinations of the axial double angle and the number of slots are shown by being divided into cases of (1) to (4) below. Further, numerals (1) to (4) of FIG. 9 are associated with the following divided cases (1) to (4).

(1) A combination of the axial double angle and the number of slots in which spatial orders of error components of the first and second orders are avoided and the tooth 27, not having the first and second output windings 23 and 24 wound therearound, exists in the detecting stator 2.

(2) A combination of the axial double angle and the number of slots in which spatial orders of error components of the first, second, and fourth orders are avoided and the tooth 27, not having the first and second output windings 23 and 24 wound therearound, exists in the detecting stator 2.

(3) A combination of the axial double angle and the number of slots in which spatial orders of error components of the first and second orders are avoided and the tooth 27, not having the first and second output windings 23 and 24 wound therearound, does not exist in the detecting stator 2.

(4) A combination of the axial double angle and the number of slots in which spatial orders of error components of the first, second, and fourth orders are avoided and the tooth 27, not having the first and second output windings 23 and 24 wound therearound, does not exist in the detecting stator 2.

In the combinations of the axial double angle and the number of slots in the cases (1) and (2) above, the tooth 27 not having the first and second output windings 23 and 24 wound therearound exists, thereby being capable of improving winding workability at the time of winding the output windings around mutually adjacent teeth 27, and this combination is also applicable to a wire connection space of a lead wire, thereby being capable of improving wire connection workability. Further, diameters of the conductive wires of the output windings wound around the mutually adjacent teeth 27 can be increased, and hence the winding is hardly cut off, thereby being capable of further improving the winding workability. Moreover, due to existence of the tooth 27 not having the first and second output windings 23 and 24 wound therearound, a copper amount and resistance of the output windings as a whole can be reduced. In addition, due to reduction in resistance of the output windings, copper losses that occur in the first and second output windings 23 and 24 can be reduced, thereby being capable of improving the reliability of the rotation angle detector 1.

Second Embodiment

Figure 10:
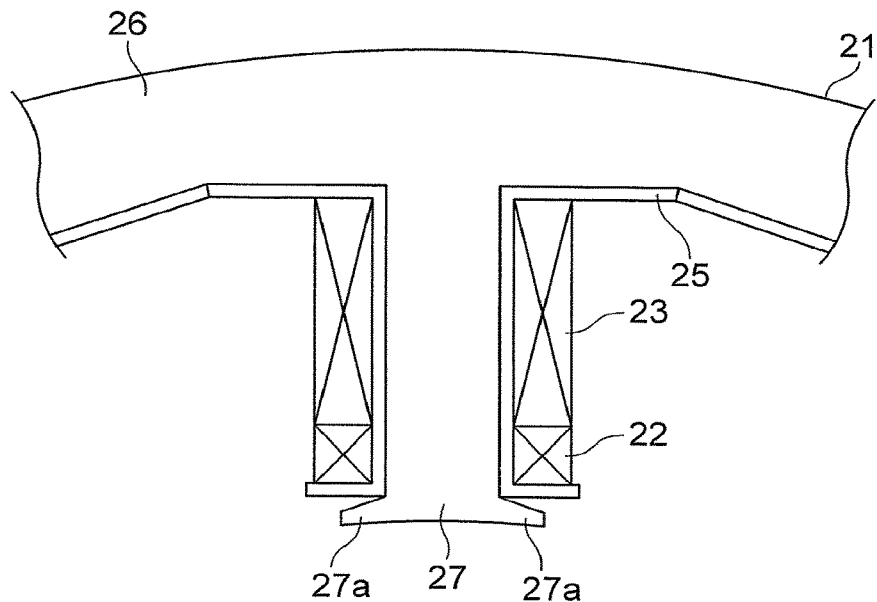
FIG. 10 is an enlarged view for illustrating a main part of a rotation angle detector according to a second embodiment of the present invention.

FIG. 10 is an enlarged view for illustrating a main part of the rotation angle detector 1 according to a second embodiment of the present invention. Note that, FIG. 10 is a view for illustrating a state in which the excitation winding 22 and the first output winding 23 are provided on the tooth 27. In the second embodiment, a positional relationship between the excitation winding 22 and each of the first and second output windings 23 and 24 is different from that in the first embodiment.

That is, the excitation winding 22 and the first output winding 23 provided on the common tooth 27 are arrayed in the radial direction of the detecting rotor 3. Further, the excitation winding 22 is provided in a position closer to the detecting rotor 3 than the first output winding 23 is in the radial direction of the detecting rotor 3. That is, the conductive wire of the excitation winding 22 is wound around the distal end of the tooth 27 which is close to the detecting rotor 3, and the conductive wire of the first output winding 23 is wound around a portion of the tooth 27 which is closer to the core back 26 than the excitation winding 22 is.

Similarly, the first output winding 23 provided on another tooth 27 is provided on the outer side of the excitation winding 22 in the radial direction of the detecting rotor 3. Further, similarly, the second output winding 24 provided on each tooth 27 is provided on the outer side of the excitation winding 22 in the radial direction of the detecting rotor 3. The other configurations are similar to those in the first embodiment.

Now, a distribution of magnetic flux densities in regions of the excitation winding 22 and the first output winding 23 that are wound around the tooth 27 of FIG. 10 has been calculated. Further, for making comparison with the distribution of magnetic flux densities of FIG. 11, a distribution of magnetic flux densities in regions of the excitation winding 22, the first output winding 23, and the second output winding 24 in the comparative example of FIG. 6 has also been calculated. Note that, in the second embodiment, a distribution of magnetic flux densities in regions of the excitation winding 22 and the second output winding 24 is similar to that in the case of the first output winding 23.

Figure 11:
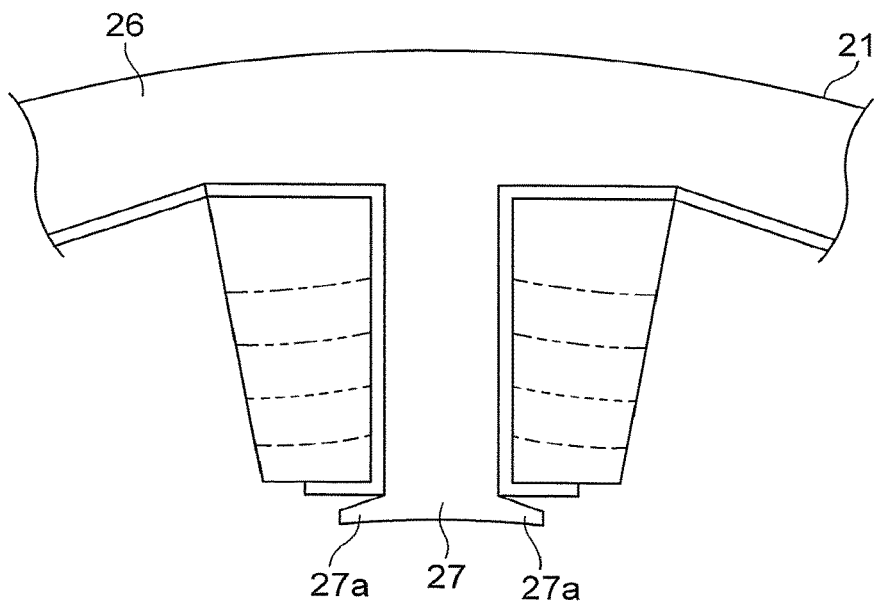
FIG. 11 is an enlarged view for illustrating a distribution of magnetic flux densities in regions of an excitation winding and a first output winding of FIG. 10.
Figure 12:
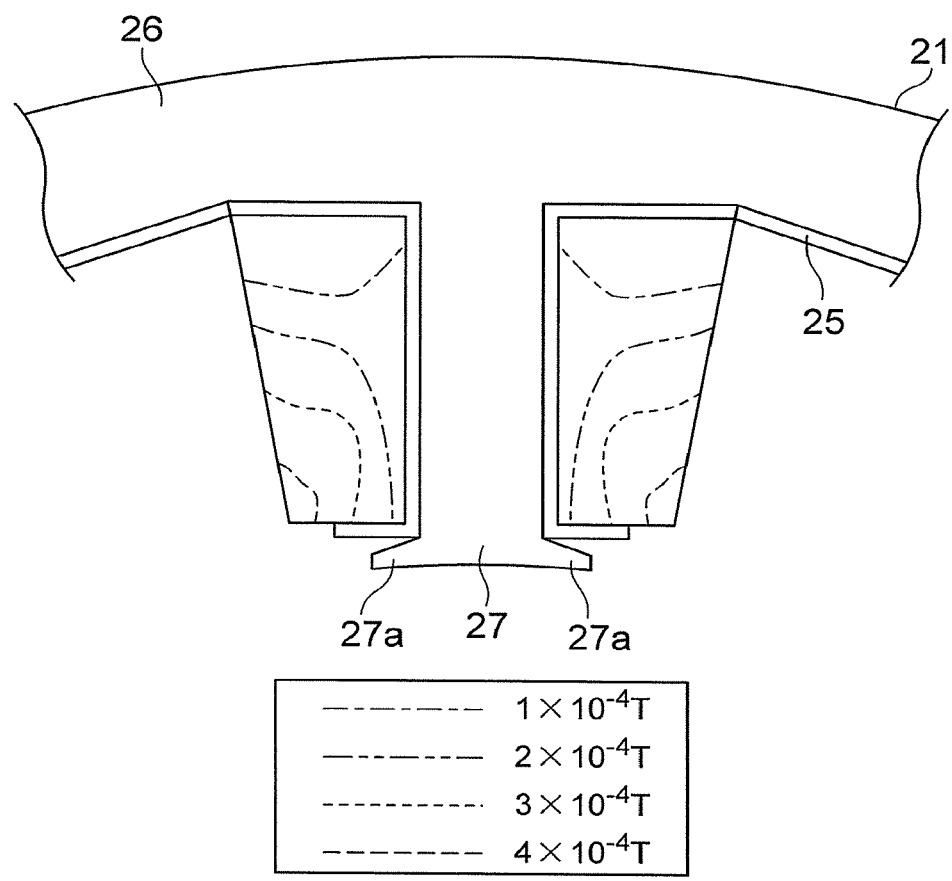
FIG. 12 is an enlarged view for illustrating a distribution of magnetic flux densities in regions of an excitation winding, a first output winding, and a second output winding according to the comparative example of FIG. 6.

FIG. 11 is an enlarged view for illustrating the distribution of the magnetic flux densities in the regions of the excitation winding 22 and the first output winding 23 of FIG. 10. Further, FIG. 12 is an enlarged view for illustrating the distribution of the magnetic flux densities in the regions of the excitation winding 22, the first output winding 23, and the second output winding 24 in the comparative example of FIG. 6. When FIG. 11 and FIG. 12 are compared to each other, it is found that a change in magnetic flux density illustrated in FIG. 11 is smaller in the circumferential direction of the detecting rotor 3 as compared to a change in magnetic flux density illustrated in FIG. 12. That is, in the second embodiment, it is found that, even when each of the first output winding 23 and the second output winding 24 is displaced from a designed position in the circumferential direction of the detecting rotor 3, an output voltage from each of the first and second output windings 23 and 24 hardly changes and an error included in the output voltage of each of the first and second output windings 23 and 24 is reduced as compared to the comparative example.

Figure 13:
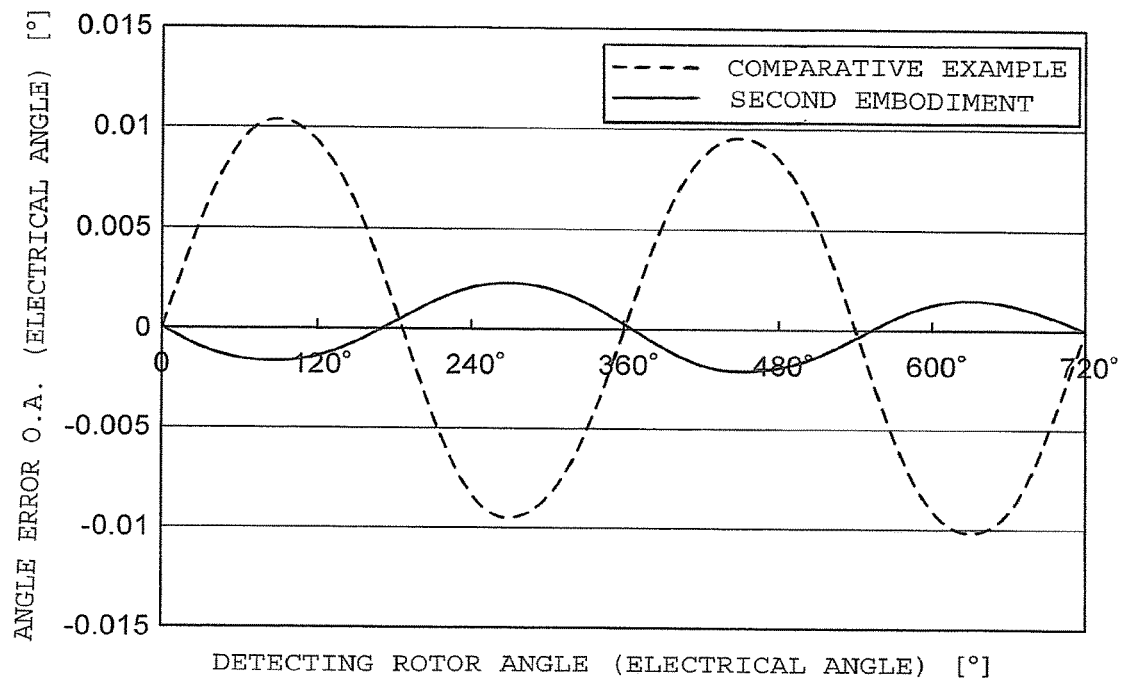
FIG. 13 is a graph for comparing a rotation angle error of a detecting rotor in the rotation angle detector according to the second embodiment of the present invention and a rotation angle error of a detecting rotor in the rotation angle detector according to the comparative example of FIG. 6.

FIG. 13 is a graph for comparing a rotation angle error of the detecting rotor 3 in the rotation angle detector 1 according to the second embodiment of the present invention and a rotation angle error of the detecting rotor in the rotation angle detector according to the comparative example of FIG. 6. Note that, in FIG. 13, the rotation angle error of the detecting rotor 3 according to the second embodiment is indicated by the solid line, and the rotation angle error of the detecting rotor according to the comparative example of FIG. 6 is indicated by the broken line. As shown in FIG. 13, it is found that the rotation angle error of the detecting rotor 3 according to the second embodiment is greatly smaller than the rotation angle error of the detecting rotor according to the comparative example.

In the rotation angle detector 1 as thus described, the excitation winding 22 is provided in the position closer to the detecting rotor 3 than each of the output windings 23 and 24 is in the radial direction of the detecting rotor 3 in the common tooth 27, and hence the change in magnetic flux density on the periphery of the tooth 27 can be reduced in the circumferential direction of the detecting rotor 3. With this, even when each of the first and second output windings 23 and 24 is displaced from the designed position in the circumferential direction of the detecting rotor 3, it is possible to suppress a variation in magnetic flux interlinked to each of the first and second output windings 23 and 24. Accordingly, an increase in error included in the output voltage of each of the first and second output windings 23 and 24 can be suppressed, to thereby suppress deterioration in detection accuracy. Further, the variation in magnetic flux interlinked to each of the first and second output windings 23 and 24 can be suppressed, and hence when a plurality of rotation angle detectors 1 are manufactured, it is possible to reduce a variation in detection accuracy in each rotation angle detector 1.

In the second embodiment, the first output winding 23 or the second output winding 24 and the excitation winding 22 cannot be provided in advance on the insulating body 25 before the insulating body 25 is mounted to the tooth 27 because the pair of projections 27a becomes obstructive. Thus, in the second embodiment, a winding machine (not shown) is used to wind the conductive wire around each tooth 27 having the insulating body 25 mounted thereto, to thereby provide the first output winding 23 or the second output winding 24 and the excitation winding 22 on the tooth 27. In this case, the conductive wire is wound around the tooth 27 with the winding machine, and hence the position of the conductive wire is easily displaced from the designed position. In the second embodiment, even when the conductive wire is wound around the tooth 27 with the winding machine, which easily makes the position of the conductive wire displaced as thus described, it is possible to suppress an increase in error included in the output voltage of each of the first and second output windings 23 and 24.

Further, the excitation winding 22 is provided in the position closer to the detecting rotor 3 than each of the first and second output windings 23 and 24 is in the radial direction of the detecting rotor 3, to thereby eliminate the need for winding the conductive wire of each of the first and second output windings 23 and 24 around the outer periphery of the excitation winding 22. It is thus possible to suppress occurrence of winding collapse in the first and second output windings 23 and 24. Further, the conductive wires can be wound around each tooth 27 in a sequence starting from any one of the excitation winding 22 and the output windings 23 and 24, to thereby easily manufacture the detecting stator 2.

Note that, although the excitation winding 22 is provided in the position closer to the detecting rotor 3 than each of the output windings 23 and 24 is in the radial direction of the detecting rotor 3 out of the excitation winding 22 and each of the output windings 23 and 24 provided on the common tooth 27 in the above example, each of the output windings 23 and 24 may be provided in a position closer to the detecting rotor 3 than the excitation winding 22 is in the radial direction of the detecting rotor 3 out of the excitation winding 22 and each of the output windings 23 and 24 provided on the common tooth 27. Also in this manner, the change in magnetic flux density in the region of each of the first and second output windings 23 and 24 can be reduced in the circumferential direction of the detecting rotor 3, to thereby suppress a variation in magnetic flux interlinked to each of the first and second output windings 23 and 24.

Further, as seen from the distribution of the magnetic flux densities of FIG. 11, an inclination of the magnetic flux density with respect to the circumferential direction of the detecting rotor 3 is larger on the distal end side of the tooth 27 (namely, in the position closer to the detecting rotor 3), and hence it is desirably configured such that in the slot 28, the whole excitation winding 22 is provided in a range closer to the detecting rotor 3 out of ranges of the tooth 27 in the radial direction of the detecting rotor 3, and in a range within one half of a length of the tooth 27. In this manner, the variation in magnetic flux distribution in the slot 28 can further be reduced, and even when the position of each of the first and second output windings 23 and 24 varies, the variation in output voltage of each of the output windings 23 and 24 can further be reduced. It is thereby possible to further suppress deterioration in detection accuracy of the rotation angle detector 1.

Third Embodiment

Figure 14:
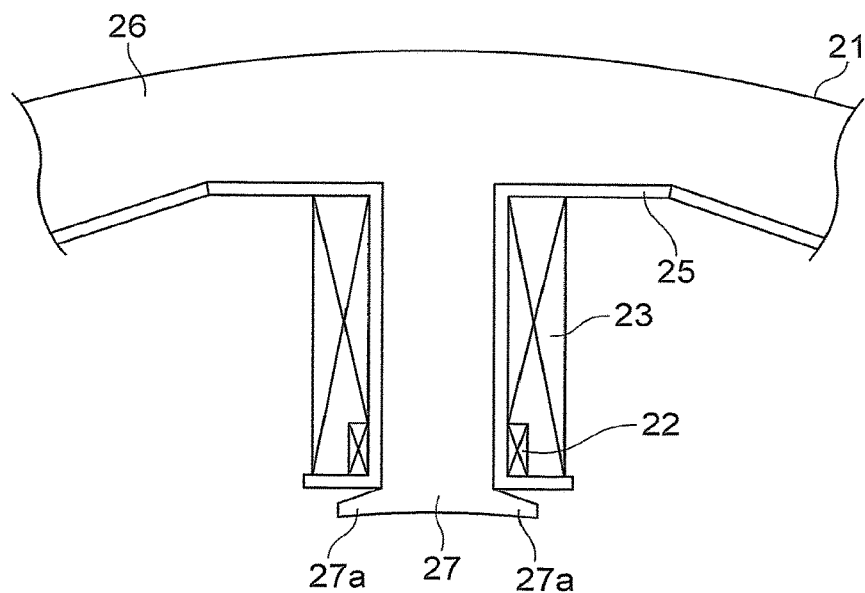
FIG. 14 is an enlarged view for illustrating a main part of a rotation angle detector according to a third embodiment of the present invention.

FIG. 14 is an enlarged view for illustrating a main part of the rotation angle detector 1 according to a third embodiment of the present invention. Note that, FIG. 14 is a view for illustrating a state in which the excitation winding 22 and the first output winding 23 are provided on the tooth 27. In the third embodiment, a positional relationship between the excitation winding 22 and each of the first and second output windings 23 and 24 is different from that in the first embodiment.

That is, out of the excitation winding 22 and the first output winding 23 provided on the common tooth 27, the first output winding 23 is provided over the range of the tooth 27 in the radial direction of the detecting rotor 3, and the excitation winding 22 is provided only in part of the range of the tooth 27 in the radial direction of the detecting rotor 3. In this example, the excitation winding 22 is provided only at the distal end of the tooth 27 which is close to the detecting rotor 3. The first output winding 23 is provided while covering the outer periphery of the excitation winding 22, and also provided in a portion of the tooth 27 which is closer to the core back 26 than the excitation winding 22 is (namely, a portion of the tooth 27 which exists in a position more distant from the detecting rotor 3 than the excitation winding 22 is in the radial direction of the detecting rotor 3).

Similarly, the first output winding 23 provided on another tooth 27 is provided while covering the outer periphery of the excitation winding 22, and also provided in a portion of the tooth 27 which is closer to the core back 26 than the excitation winding 22 is. Further, similarly, the second output winding 24 provided on each tooth 27 is provided while covering the outer periphery of the excitation winding 22, and also provided in a portion of the tooth 27 which is closer to the core back 26 than the excitation winding 22 is.

The conductive wire of each of the first and second output windings 23 and 24 is wound around the tooth 27 so as to cover the excitation winding 22 together with the tooth 27 after winding of the conductive wire of the excitation winding 22 around the tooth 27. The other configurations are similar to those in the first embodiment.

In the rotation angle detector 1 as thus described, each of the first and second output windings 23 and 24 is provided while covering the outer periphery of the excitation winding 22, and also provided in the portion of the tooth 27 which exists in the position more distant from the detecting rotor 3 than the excitation winding 22 does in the radial direction of the detecting rotor 3. Thus, the number of turns in each of the first and second output windings 23 and 24 can be increased, to thereby increase the output voltage of each of the first and second output windings 23 and 24 without increasing a value of a current flowing through the excitation winding 22.

Further, the excitation winding 22 is provided only at the distal end of the tooth 27 which is close to the detecting rotor 3, and hence similarly to the second embodiment, a variation in magnetic flux interlinked to each of the first and second output windings 23 and 24 can be suppressed, to thereby reduce a variation in detection accuracy in each rotation angle detector when a plurality of rotation angle detectors are manufactured.

Moreover, the number of turns of the conductive wire in the excitation winding 22 is the same on every tooth 27, and hence even when the conductive wire of each of the first and second output windings 23 and 24 is wound around the outer periphery of the excitation winding 22, the conductive wire of each of the first and second output windings 23 and 24 can be wound without being affected by the number of turns in the excitation winding 22, to thereby suppress occurrence of winding collapse of the conductive wire in each of the first and second output windings 23 and 24.

Note that, although the excitation winding 22 is provided only in the position of the tooth 27 which is close to the detecting rotor 3 in the radial direction of the detecting rotor 3 in the above example, the excitation winding 22 may be provided only in a position of the tooth 27 which is distant from the detecting rotor 3 in the radial direction of the detecting rotor 3, and the first output winding 23 or the second output winding 24 may be provided on the outer periphery of the excitation winding 22 and in a portion of the tooth 27 which is closer to the detecting rotor 3 than the excitation winding 22 is.

Fourth Embodiment

Figure 15:
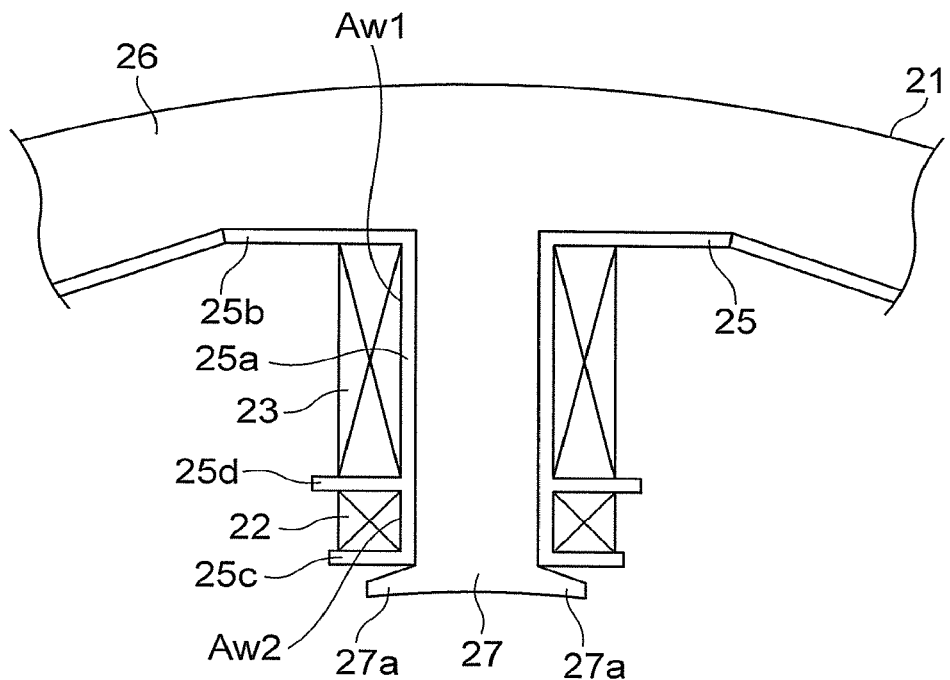
FIG. 15 is an enlarged view for illustrating a main part of a rotation angle detector according to a fourth embodiment of the present invention.

FIG. 15 is an enlarged view for illustrating a main part of the rotation angle detector 1 according to a fourth embodiment of the present invention. Note that, FIG. 15 is a view for illustrating a state in which the excitation winding 22 and the first output winding 23 are provided on the tooth 27. Further, the excitation winding 22 and the second output winding 24 that are provided on the tooth 27 have a configuration similar to that of FIG. 15.

The insulating body 25 includes: a winding core part 25a provided along the side surface of each tooth 27; an outer insulating part 25b projecting along the inner peripheral surface of the core back 26 from the outer end of the winding core part 25a in the radial direction; an inner insulating part 25c projecting outward in the circumferential direction of the detecting rotor 3 from the inner end of the winding core part 25a in the radial direction; and a partition part 25d projecting to the outside of the detecting rotor 3 from the winding core part 25a in the circumferential direction between the outer insulating part 25b and the inner insulating part 25c. In this example, the insulating body 25 is formed of a synthetic resin material (for example, Nylon 66 (trade mark) (glass fiber reinforced product), or the like).

A first winding region Aw1 is formed between the outer insulating part 25b and the partition part 25d, and a second winding region Aw2 is formed between the inner insulating part 25c and the partition part 25d. Further, the first winding region Aw1 is located outside the second winding region Aw2 in the radial direction of the detecting rotor 3. The excitation winding 22 is provided in the second winding region Aw2, and the first output winding 23 or the second output winding 24 is provided in the first winding region Aw1. Hence, each of the first and second output windings 23 and 24 and the excitation winding 22 are partitioned by the partition part 25d in the radial direction of the detecting rotor 3. The other configurations are similar to those in the second embodiment.

In the rotation angle detector 1 as thus described, the insulating body 25 includes the partition part 25d configured to partition between each of the first and second output windings 23 and 24 and the excitation winding 22 in the radial direction of the detecting rotor 3, and hence it is possible to easily ensure an insulating state between each of the first and second output windings 23 and 24 and the excitation winding 22.

Further, by taking the partition part 25d as a reference, the respective positions of each of the first and second output windings 23 and 24 and the excitation winding 22 can be more reliably determined. With this, also by winding the conductive wire around the tooth 27 with an automatic winding machine, each of the first and second output windings 23 and 24 and the excitation winding 22 can be more reliably and accurately arranged in the slot 28 separately in the radial direction of the detecting rotor 3, to thereby determine the respective positions of the excitation winding 22 and each of the first and second output windings 23 and 24 more accurately than in the case of the second or third embodiment. Accordingly, it is possible to reduce manufacturing cost of the rotation angle detector 1, and also to improve the detection accuracy by reducing winding disorder of the conductive wire in each of the excitation winding 22 and the first and second output windings 23 and 24.

Note that, the partition part 25d may be formed as part of the detecting stator core 21 obtained by laminating silicon steel plates. However, it is preferred to form the partition part 25d by a non-magnetic body from the viewpoint of preventing a leakage magnetic flux.

Further, although the excitation winding 22 is provided only in the position of the tooth 27 which is close to the detecting rotor 3 in the radial direction of the detecting rotor 3 in the above example, the excitation winding 22 may be provided only in a position of the tooth 27 which is distant from the detecting rotor 3 in the radial direction of the detecting rotor 3, and the first output winding 23 or the second output winding 24 may be provided on the outer periphery of the excitation winding 22 and in a portion of the tooth 27 which is closer to the detecting rotor 3 than the excitation winding 22 is. That is, the excitation winding 22 may be provided in the first winding region Aw1, and the first output winding 23 or the second output winding 24 may be provided in the second winding region Aw2.

Fifth Embodiment

Figure 16:
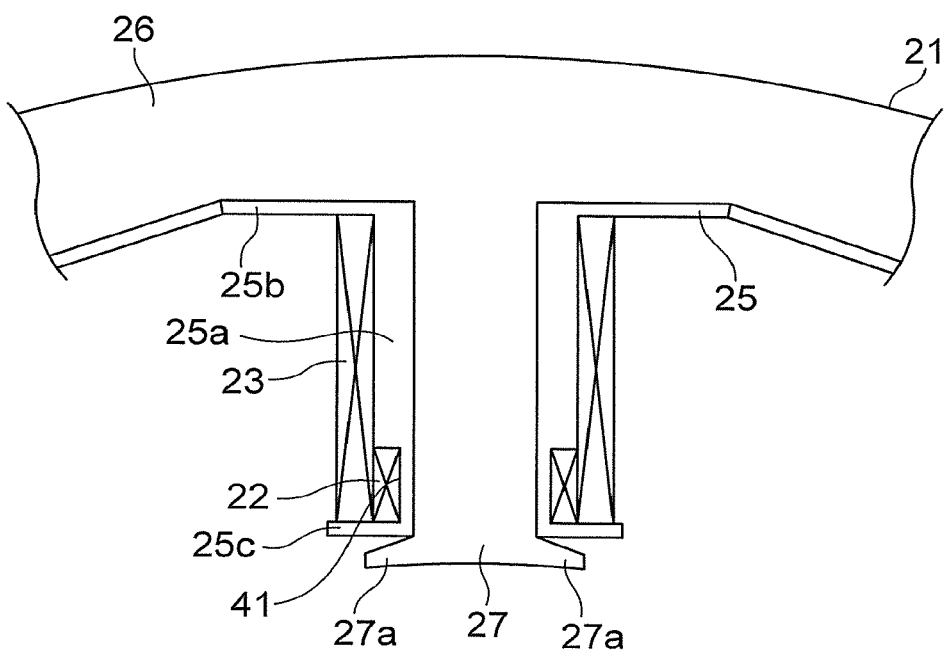
FIG. 16 is an enlarged view for illustrating a main part of a rotation angle detector according to a fifth embodiment of the present invention.

FIG. 16 is an enlarged view for illustrating a main part of the rotation angle detector 1 according to a fifth embodiment of the present invention. Note that, FIG. 16 is a view for illustrating a state in which the excitation winding 22 and the first output winding 23 are provided on the tooth 27. The excitation winding 22 and the second output winding 24 that are provided on the tooth 27 have a configuration similar to that of FIG. 16.

A recess 41, into which the excitation winding 22 is to be fitted, is formed in part of the outer peripheral surface of the winding core part 25a. The recess 41 is formed only in a position of the winding core part 25a which is close to the detecting rotor 3 in the radial direction of the detecting rotor 3 (namely, a position corresponding to the distal end of the tooth 27). In this example, the whole excitation winding 22 is received in the recess 41. Further, in this example, the excitation winding 22 is received in the recess 41, with a thickness of the excitation winding 22 matched to a depth of the recess 41. The other configurations are similar to those in the third embodiment.

In the rotation angle detector 1 as thus described, the recess 41, into which the excitation winding 22 is to be fitted, is formed in part of the outer peripheral surface of the winding core part 25a, and hence the excitation winding 22 can be more accurately and easily positioned on the tooth 27, to thereby suppress a variation in position of the excitation winding 22 which occurs on each tooth 27 or in each rotation angle detector 1. Further, when the conductive wire of the first output winding 23 or the second output winding 24 is to be wound around the outer periphery of the excitation winding 22, it is possible to suppress occurrence of winding collapse of the conductive wire in the first output winding 23 or the second output winding 24. It is thereby possible to further improve the detection accuracy of the rotation angle detector 1.

Note that, although the whole excitation winding 22 is received in the recess 41 in the above example, at least part of the excitation winding 22 only needs to be received in the recess 41 because the excitation winding 22 can be more accurately and easily positioned so long as the excitation winding 22 is fitted into the recess 41.

Further, although the recess 41 is formed in the position of the winding core part 25a which is close to the detecting rotor 3 in the above example, the position of the recess 41 is not limited to this, and for example, the recess 41 may be formed in a position of the winding core part 25a which is distant from the detecting rotor 3 in the radial direction of the detecting rotor 3.

Sixth Embodiment

Figure 17:
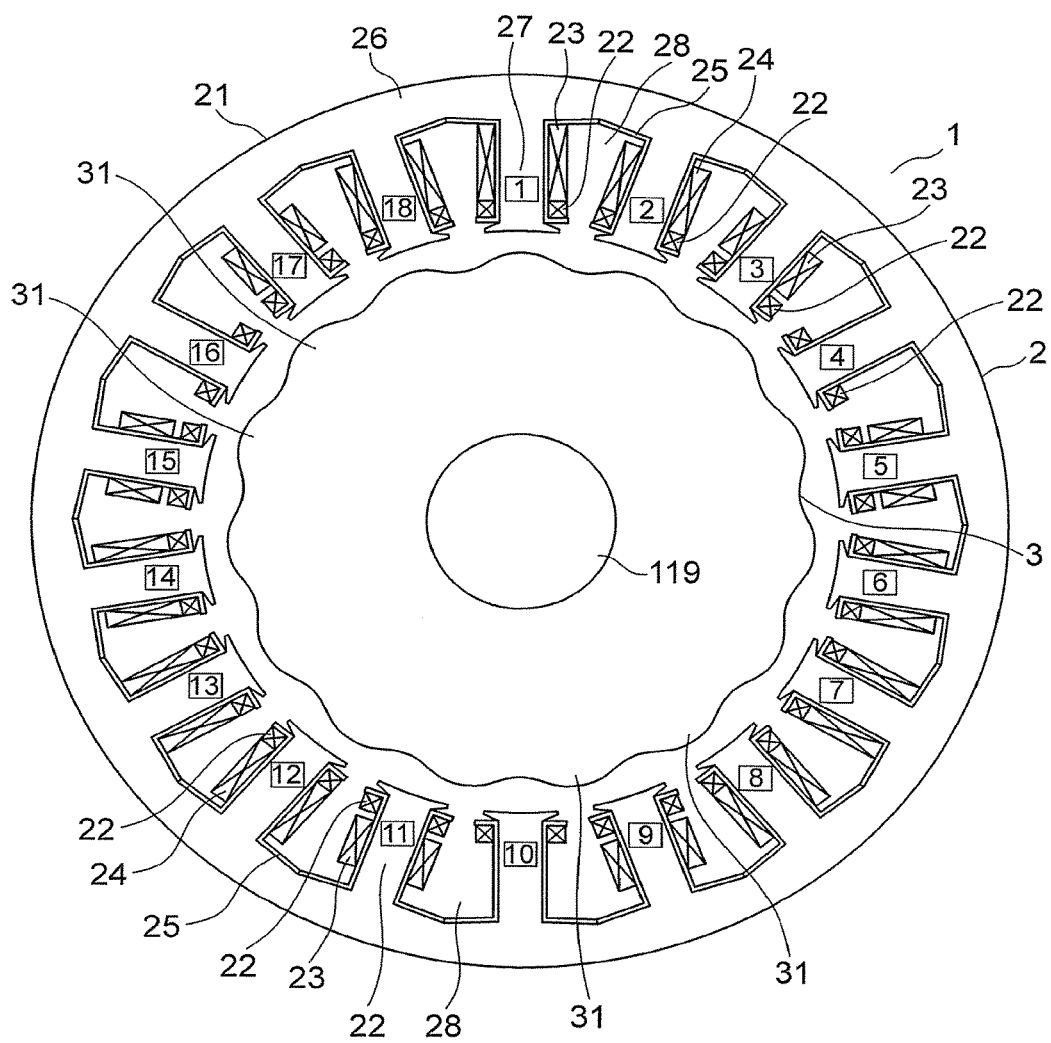
FIG. 17 is a sectional view for illustrating a rotation angle detector according to a sixth embodiment of the present invention.
Figure 18:
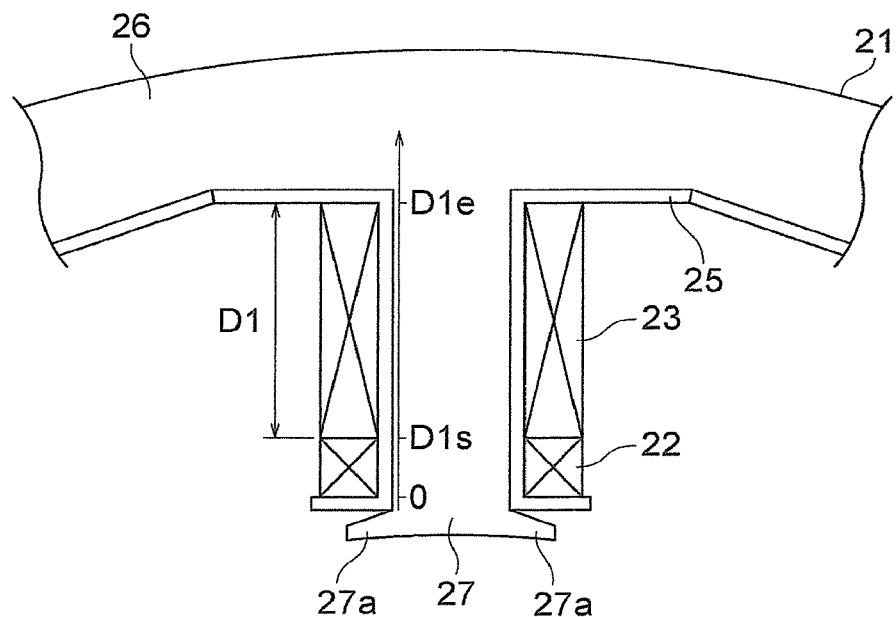
FIG. 18 is an enlarged view for illustrating a state in which an excitation winding and a first output winding with a large number of turns are provided on a tooth in FIG. 17.

FIG. 17 is a sectional view for illustrating the rotation angle detector 1 according to a sixth embodiment of the present invention. Further, FIG. 18 is an enlarged view for illustrating a state in which the excitation winding 22 and the first output winding 23 with a large number of turns are provided on the tooth in FIG. 17. Moreover, FIG. 19 is an enlarged view for illustrating a state in which the excitation winding 22 and the first output winding 23 with a small number of turns are provided on the tooth 27 in FIG. 17.

Out of the respective teeth 27 having the first output winding 23 provided thereon, the number of turns in each of the first output windings 23 (FIG. 18) provided on part of the plurality of teeth 27 (namely, the respective teeth 27 with the tooth numbers 1, 7, and 13) is different from the number of turns in each of the first output windings 23 (FIG. 19) provided on the rest of the plurality of teeth 27 (namely, the respective teeth 27 with the tooth numbers 3, 5, 9, 11, 15, and 17), as also seen from FIG. 4. In this example, the number of turns in each of the first output windings 23 provided on the respective teeth 27 with the tooth numbers 3, 5, 9, 11, 15, and 17 (namely, the number of turns in the first output winding 23 illustrated in FIG. 19) is the smallest number of turns (the minimum number of turns) among all of the first output windings 23. Further, the diameters of the conductive wires of the respective first output windings 23 are the same. Therefore, sizes of the respective regions occupied by the plurality of first output windings 23 with mutually different numbers of turns are different from each other.

Further, the respective dimensions of the plurality of first output windings 23 with mutually different numbers of turns are different from each other in the radial direction of the detecting rotor 3. That is, a radial dimension D1 of the first output winding 23 with a large number of turns is larger than a radial dimension D2 of the first output winding 23 with a small number of turns. Moreover, the respective positions (center positions) of the plurality of first output windings 23 with mutually different numbers of turns are different from each other in the radial direction of the detecting rotor 3.

Figure 19:
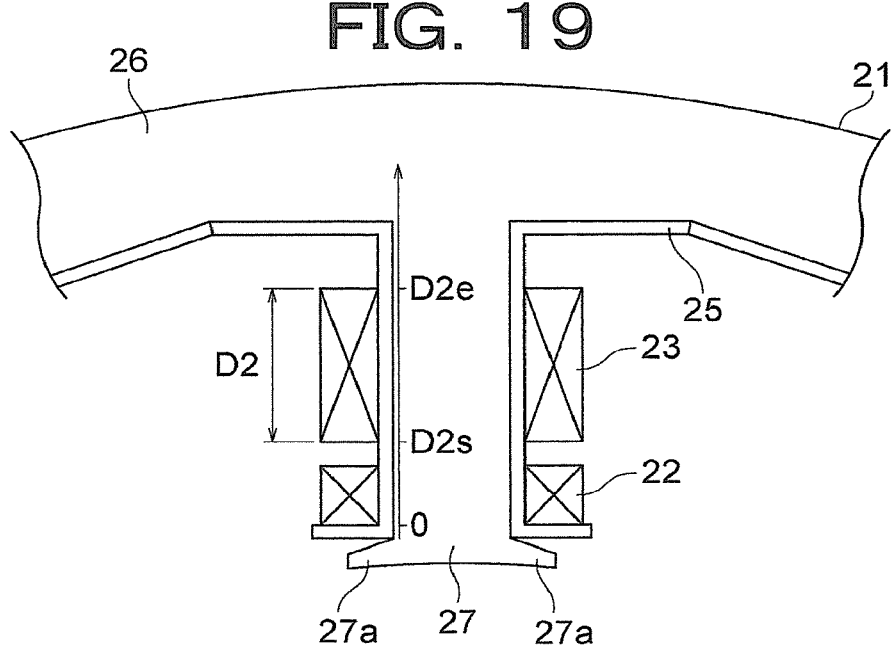
FIG. 19 is an enlarged view for illustrating a state in which the excitation winding and the first output winding with a small number of turns are provided on the tooth in FIG. 17.
Figure 20:
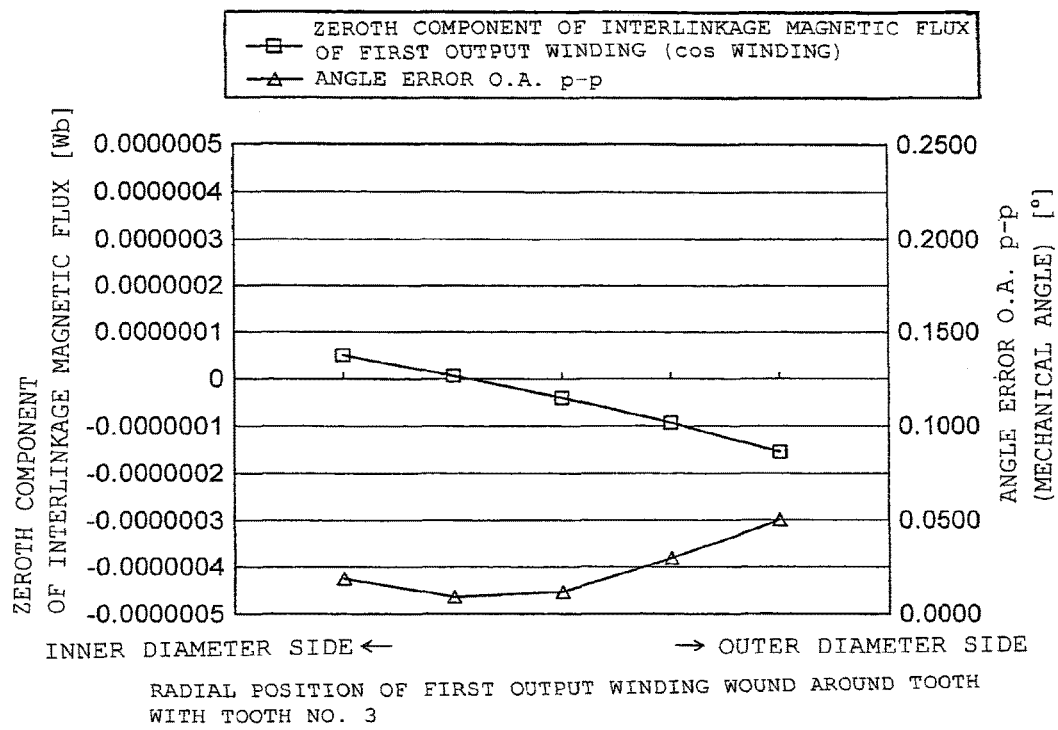
FIG. 20 is a graph for showing a relationship among a radial position of the first output winding provided on the tooth of FIG. 19, an interlinkage magnetic flux of the first output winding, and an error of an angle detected by the rotation angle detector.

FIG. 20 is a graph for showing a relationship among a radial position of the first output winding 23 provided on the tooth 27 of FIG. 19, an interlinkage magnetic flux of the first output winding 23, and an error of an angle detected by the rotation angle detector 1. As shown in FIG. 20, it is found that, when the radial position of the first output winding 23 with the smallest number of turns changes, an offset value that is a zeroth-order component of the interlinkage magnetic flux of the first output winding 23 greatly changes. Further, it is found that, when the first output winding 23 is in such a position that the offset value of the interlinkage magnetic flux of the first output winding 23 is at the minimum, the error of the angle detected by the rotation angle detector 1 is at the minimum.

Figure 21:
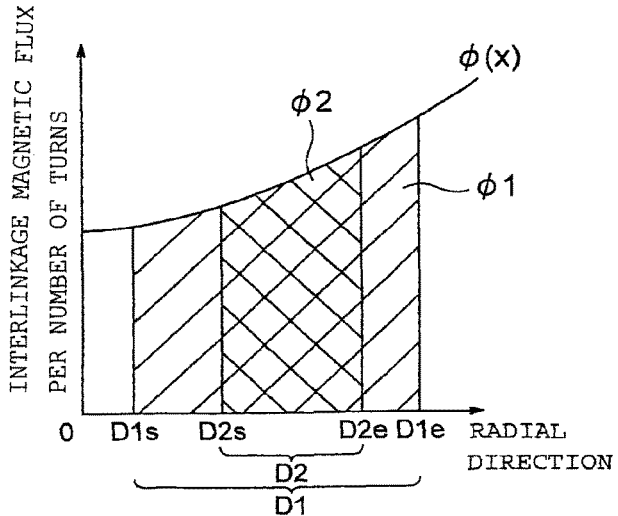
FIG. 21 is a graph for showing a distribution of magnetic flux densities in a radial direction of a detecting rotor in each of the first output windings of FIG. 18 and FIG. 19.

FIG. 21 is a graph for showing a distribution of the interlinkage magnetic flux per number of turns in the radial direction of the detecting rotor 3 in each of the first output windings 23 of FIG. 18 and FIG. 19. As shown in FIG. 21, an interlinkage magnetic flux $\varphi(x)$ per number of turns is a function with respect to an x-coordinate in the radial direction of the detecting rotor 3 with an intersection between the tooth 27 and the projection 27a taken as an origin in FIG. 18 and FIG. 19. Further, as illustrated in FIG. 18 and FIG. 19, the radial dimensions of the first output windings 23 are respectively represented by "D1=D1e−D1s" and "D2=D2e−D2s". Moreover, due to the relationship of "D1s<D2s<D2e<D1e", a relationship between an interlinkage magnetic flux φ1 in the first output winding 23 of FIG. 18 and an interlinkage magnetic flux φ2 in the first output winding 23 of FIG. 19 is represented by the following expression when the number of turns in the radial direction of the detecting rotor 3 is Wx.

[Math. 10]

$$\phi_1 = \int_{D_{1s}}^{D_{1e}} w_x \phi(x) dx > \phi_2 = \int_{D_{2s}}^{D_{2e}} w_x \phi(x) dx \quad (15)$$

As thus described, the amount of the interlinkage magnetic flux of the first output winding 23 with a large number of turns and the amount of the interlinkage magnetic flux of the first output winding 23 with a small number of turns are different from each other. Further, it is found from FIG. 21 that the interlinkage magnetic flux φ(x) per number of turns changes with respect to the x-coordinate, and hence when D2s and D2e in the first output winding 23 of FIG. 19 are different from each other, the interlinkage magnetic flux φ2 is different even in the case of D2 being the same. That is, even when the numbers of turns in the first output windings 23 are the same, the amounts of the interlinkage magnetic fluxes of the first output windings 23 are different from each other due to the difference in position of the first output winding 23 on the x-coordinate.

As thus described, an offset value is easily generated in the interlinkage of the first output winding 23 due to the difference in amount of the interlinkage magnetic flux between the plurality of first output windings 23 with mutually different numbers of turns and due to the difference in amount of the interlinkage magnetic flux of the first output winding 23 with the same number of turns and different positions of the x-coordinate as shown in FIG. 21, and due to the difference in winding direction (namely, polarity) between the plurality of first output windings 23 with mutually different numbers of turns as shown in FIG. 4. Therefore, as shown in FIG. 20, when the radial position of the first output winding 23 changes, the offset value of the interlinkage magnetic flux of the first output winding 23 greatly changes.

As the offset value of the interlinkage magnetic flux of the first output winding 23 becomes larger, the zeroth-order component of the output voltage of the first output winding 23 becomes larger, and the axial double angle component of the angle error becomes larger. Conversely, when the radial position of the first output winding 23 is adjusted so as to decrease the offset value of the interlinkage magnetic flux of the first output winding 23, it is possible to reduce the axial double angle component of the error of the angle detected by the rotation angle detector 1 from Expression (10) and Expression (14).

In the sixth embodiment, the position of the first output winding 23 with the smallest number of turns is adjusted in the radial direction of the detecting rotor 3, to thereby provide the plurality of first output windings 23 with mutually different numbers of turns in positions different from each other, and reduce the offset value of the interlinkage magnetic flux of the first output winding 23. The other configurations are similar to those in the second embodiment.

In the rotation angle detector 1 as thus described, the respective positions of the plurality of first output windings 23 with mutually different numbers of turns are different from each other in the radial direction of the detecting rotor 3, and hence by adjusting the offset value of the interlinkage magnetic flux of the first output winding 23 to be small, an increase in axial double angle component of the error of the angle detected by the rotation angle detector 1 can be suppressed, to thereby improve the detection accuracy.

Further, by adjusting the position of the first output winding 23 with the smallest number of turns out of the respective first output windings 23, the respective positions of the plurality of first output windings 23 with mutually different number of turns are made mutually different positions in the radial direction of the detecting rotor 3, and the offset value of the interlinkage magnetic flux of the first output winding 23 can thus be reduced to be small by adjusting positions of only part of the first output windings 23 out of the respective first output windings 23. With this, the operation to adjust the position of each first output winding 23 can be easily performed.

Note that, although the excitation winding 22 is provided only in the position of the tooth 27 which is close to the detecting rotor 3 in the radial direction of the detecting rotor 3 in the above example, the excitation winding 22 may be provided only in a position of the tooth 27 which is distant from the detecting rotor 3 in the radial direction of the detecting rotor 3, and the first output winding 23 or the second output winding 24 may be provided on the outer periphery of the excitation winding 22 and in a portion of the tooth 27 which is closer to the detecting rotor 3 than the excitation winding 22 is.

Seventh Embodiment

Figure 22:
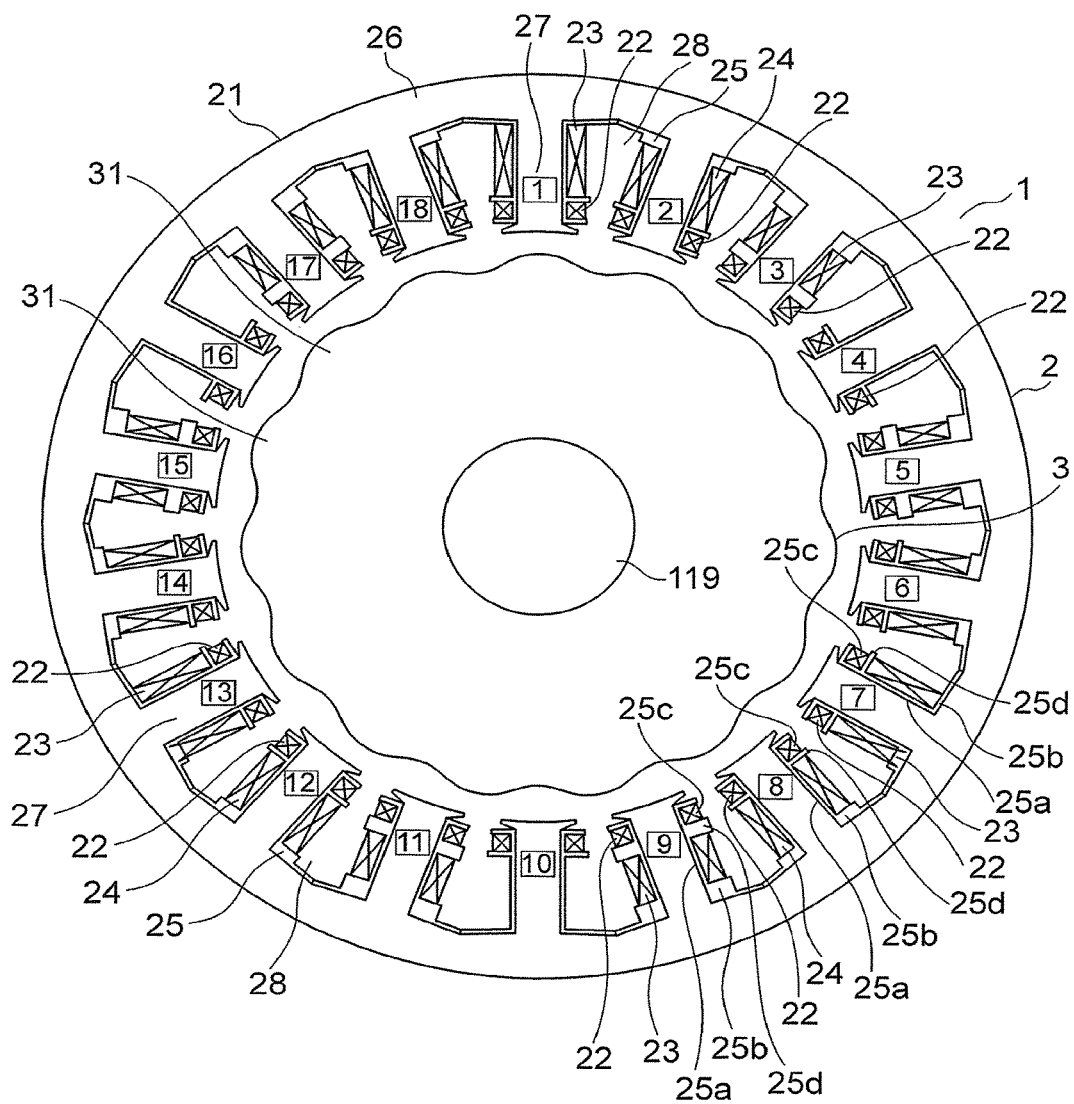
FIG. 22 is a sectional view for illustrating a rotation angle detector according to a seventh embodiment of the present invention.
Figure 23:
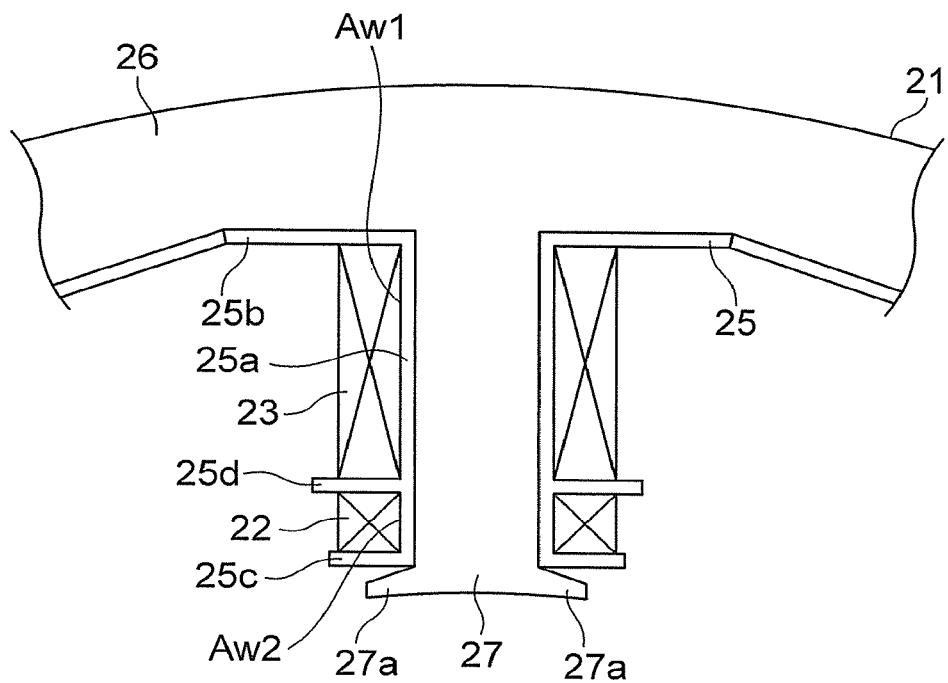
FIG. 23 is an enlarged view for illustrating a state in which an excitation winding and a first output winding with a large number of turns are provided on a tooth in FIG. 22.
Figure 24:
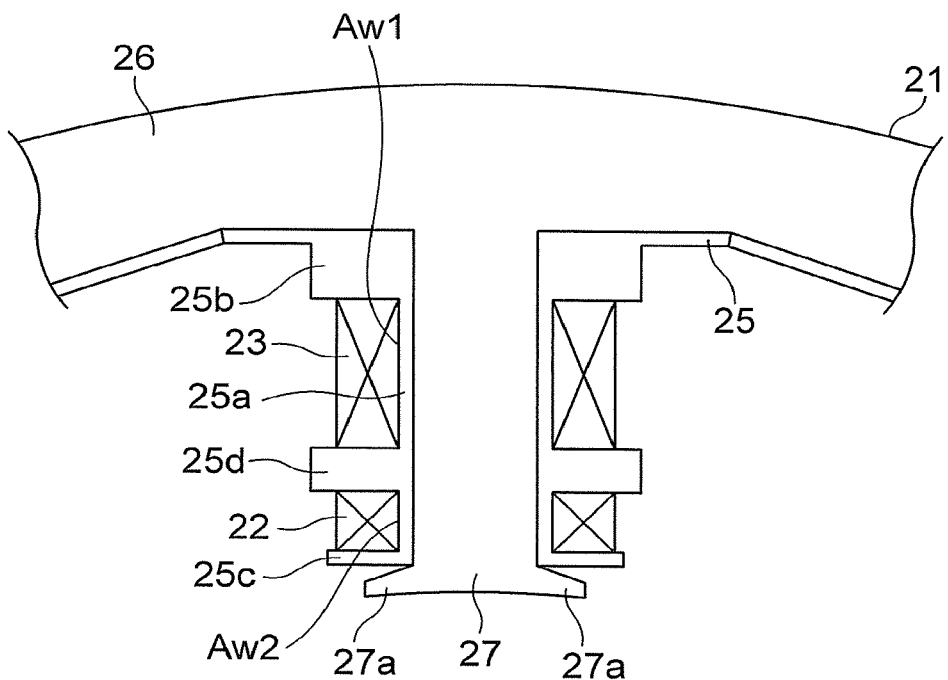
FIG. 24 is an enlarged view for illustrating a state in which the excitation winding and the first output winding with a small number of turns are provided on the tooth in FIG. 22.

FIG. 22 is a sectional view for illustrating the rotation angle detector 1 according to a seventh embodiment of the present invention. Further, FIG. 23 is an enlarged view for illustrating a state in which the excitation winding 22 and the first output winding 23 with a large number of turns are provided on the tooth in FIG. 22. Moreover, FIG. 24 is an enlarged view for illustrating a state in which the excitation winding 22 and the first output winding 23 with a small number of turns are provided on the tooth 27 in FIG. 22.

The respective configurations of each first output winding 23 and each second output winding 24 are similar to those in the sixth embodiment. That is, a radial dimension D1 of the first output winding 23 with a large number of turns is larger than a radial dimension D2 of the first output winding 23 with a small number of turns. Further, the respective positions (center positions) of the plurality of first output windings 23 with mutually different numbers of turns are different from each other in the radial direction of the detecting rotor 3.

In the seventh embodiment, the space between the first output winding 23 and the core back 26 is filled by the outer insulating part 25b, and the space between the first output winding 23 and the excitation winding 22 is filled by the partition part 25d. Further, a dimension of the outer insulating part 25b located between the first output winding 23 and the core back 26 and a dimension of the partition part 25d located between the first output winding 23 and the excitation winding 22 are set in the radial direction of the detecting rotor 3 in accordance with each of the radial dimensions D1 and D2 of each first output winding 23 (FIG. 18 and FIG. 19).

Hence, the respective dimensions of the outer insulating part 25b and the partition part 25d with respect to each of the first output windings 23 having the mutually different radial dimensions D1 and D2 are different from each other in the radial direction of the detecting rotor 3. That is, the respective dimensions of the outer insulating part 25b and the partition part 25d with respect to the first output winding 23 having the radial dimension D2 (namely, a small number of turns) are larger in the radial direction of the detecting rotor 3 than the respective dimensions of the outer insulating part 25b and the partition part 25d with respect to the first output winding 23 having the radial dimension D1 larger than the radial dimension D2 (namely, a large number of turns). The other configurations are similar to those in the fourth embodiment.

In the rotation angle detector 1 as thus described, the space between the first output winding 23 and the core back 26 is filled by the outer insulating part 25b and the space between the first output winding 23 and the excitation winding 22 is filled by the partition part 25d with respect to each of the first output windings 23 having mutually different radial dimensions D1 and D2. Thus, even in the case of the respective first output windings 23 having mutually different radial dimensions D1 and D2, it is possible to determine the positions of the first output windings 23 with the outer insulating part 25b and the partition part 25d taken as references, and to more accurately and easily position each first output winding 23 in the radial direction of the detecting rotor 3. Further, the positions of the plurality of first output winding 23 with mutually different number of turns are different from each other in the radial direction of the detecting rotor 3, and hence similarly to the sixth embodiment, the detection accuracy can be improved by adjusting the positions of the respective first output windings 23.

Further, although the excitation winding 22 is provided only in the position of the tooth 27 which is close to the detecting rotor 3 in the radial direction of the detecting rotor 3 in the above example, the excitation winding 22 may be provided only in a position of the tooth 27 which is distant from the detecting rotor 3 in the radial direction of the detecting rotor 3, and the first output winding 23 or the second output winding 24 may be provided on the outer periphery of the excitation winding 22 and in a portion of the tooth 27 which is closer to the detecting rotor 3 than the excitation winding 22 is. That is, the excitation winding 22 may be provided in the first winding region Aw1, and the first output winding 23 or the second output winding 24 may be provided in the second winding region Aw2.

Eighth Embodiment

Figure 25:
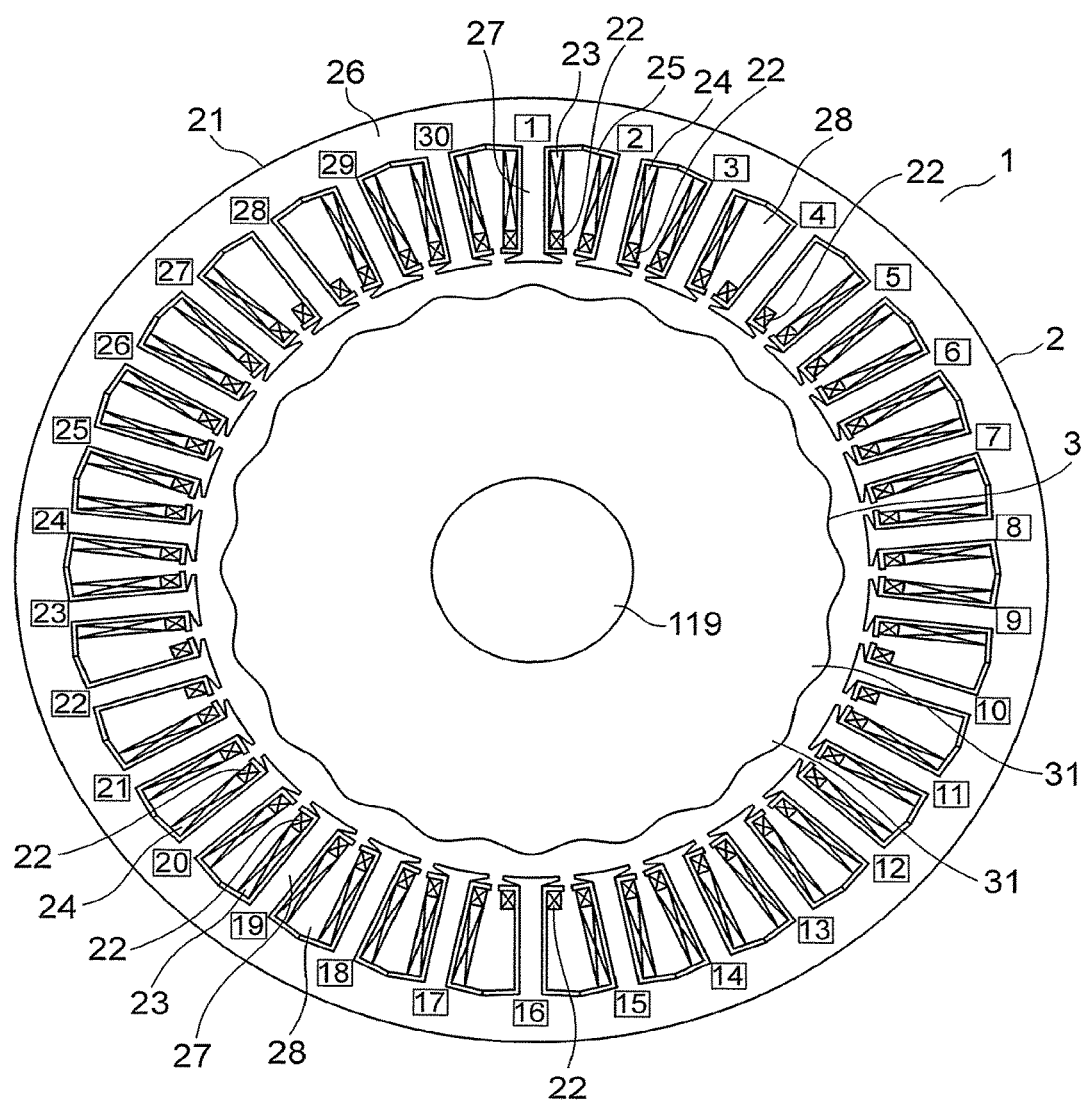
FIG. 25 is a sectional view for illustrating a rotation angle detector according to an eighth embodiment of the present invention.

FIG. 25 is a sectional view for illustrating the rotation angle detector 1 according to an eighth embodiment of the present invention. Further, FIG. 26 is a table for showing the number of turns of the conductive wire in each of the excitation windings 22, the first output windings 23, and the second output windings 24 of FIG. 25. Note that, tooth numbers shown in FIG. 26 are numbers conveniently allocated to the respective teeth 27 of FIG. 25 and are sequential in the circumferential direction (numbers surrounded by quadrangular frames in FIG. 25). Further, a number under the tooth number of FIG. 26 is the number of turns of the conductive wire wound around the tooth 27 corresponding to the tooth number. Moreover, a positive number and a negative number in the numbers of turns in FIG. 26 represent that winding directions of the conductive wires are opposite to each other.

In the eighth embodiment, the number of teeth 27, the number of turns in each of the excitation winding 22, the first output winding 23, and the second output winding 24, and the number of salient poles 31 of the detecting rotor 3 are different from those in the first embodiment.

That is, in the eighth embodiment, the number of teeth 27 arrayed at regular intervals in the circumferential direction is 30. Further, when the detecting rotor 3 is rotated with respect to the detecting stator 2, a pulsation of permeance between the detecting rotor 3 and the detecting stator 2 changes in the sine-wave shape due to existence of each salient pole 31.

The conductive wire of the excitation winding 22 is wound 40 times around every tooth 27 such that the respective winding directions of the mutually adjacent teeth 27 are opposite to each other.

The conductive wire of the first output winding 23 is wound 380 times around each of the teeth 27 with the tooth numbers 1, 7, 13, 19, and 25 and is wound 190 times around each of the teeth 27 with the tooth numbers 3, 5, 9, 11, 15, 17, 21, 23, 27, and 29. The conductive wire of the first output winding 23 wound around each of the teeth 27 with the tooth numbers 1, 7, 13, 19, and 25 is wound in the same direction. The conductive wire of the first output winding 23 wound around each of the teeth 27 with the tooth numbers 3, 5, 9, 11, 15, 17, 21, 23, 27, and 29 is wound in the opposite direction to the winding direction of the conductive wire of the first output winding 23 wound around each of the teeth 27 with the tooth numbers 1, 7, 13, 19, and 25.

The conductive wire of the second output winding 24 is wound 330 times around each of the teeth 27 with the tooth numbers 2, 6, 8, 12, 14, 18, 20, 24, 26, and 30. The conductive wire of the second output winding 24 wound around each of the teeth 27 with the tooth numbers 2, 8, 14, 20, and 26 is wound in the same direction. Further, the conductive wire of the second output winding 24 wound around each of the teeth 27 with the tooth numbers 2, 8, 14, 20, and 26 is wound in the opposite direction to the winding direction of the conductive wire of the second output winding 24 wound around each of the teeth 27 with the tooth numbers 6, 12, 18, 24, and 30. The first and second output windings 23 and 24 are not wound around each of the teeth 27 with the tooth numbers 4, 10, 16, 22, and 28 in order to distribute the output windings in the sine-wave shape. The other configurations are similar to those in the first embodiment.

FIG. 27 is a table for showing, as Example 8-1, the number of salient poles 31 (axial double angle), the number of teeth 27, a spatial order of the excitation winding 22, and a spatial order of each of the first and second output windings 23 and 24 in the rotation angle detector 1 of FIG. 25. Note that, in FIG. 27, not only as Example 8-1, but also as Examples 8-2 and 8-3 in which the number of salient poles 31 (axial double angle) has been changed in the eighth embodiment, the number of teeth 27, a spatial order of the excitation winding 22, and a spatial order of each of the first and second output windings 23 and 24 are shown.

In Example 8-1 in the eighth embodiment, in FIG. 27, the axial double angle N is 20, the spatial order M of the excitation winding 22 (namely, the number corresponding to half the number of teeth 27) is 15, and the spatial order $|M \pm N|$ of the first and second output windings 23 and 24 is 35 or 5 (note that, 35 is equivalent to 5). Therefore, in Example 8-1, the error spatial order $\delta = |M - |M \pm N||$ detected by each of the first and second output windings 23 and 24 is 20 and 10, and the error spatial order $\varepsilon=|\delta-M|$ to detect the spatial order $\delta$ is 5. That is, in Example 8-1, the error spatial orders $\delta$ and $\varepsilon$ are set to values other than 1, 2, 3, and 4.

Therefore, in Example 8-1, the error spatial order $\delta$ is 20 and 10 and the error spatial order $\varepsilon$ to detect the spatial order $\delta$ is 5, and hence the first and second output windings 23 and 24 do not pick up the error spatial orders of the first, second, third, and fourth orders which are low order components of the error spatial orders. Thus, in Example 8-1, the first and second output windings 23 and 24 do not pick up the error components of the first, second, third, and fourth orders, thereby being capable of reducing angle error of the rotation angle detector 1 with respect to noises of eccentricity, elliptical deformation, triangular deformation, quadrangular deformation, magnetic anisotropy, and the like of the detecting stator 2 or the detecting rotor 3.

Further, in Example 8-2 of FIG. 27, the axial double angle N is 10, the spatial order M of the excitation winding 22 is 15, and the spatial order $|M\pm N|$ of the first and second output windings 23 and 24 is 25 or 5 (note that, 25 is equivalent to 5). Therefore, in Example 8-2, the error spatial order $\delta=|M-|M\pm N||$ detected by each of the first and second output windings 23 and 24 is 10, and the error spatial order $\varepsilon=|\delta-M|$ to detect the spatial order $\delta$ is 5. That is, also in Example 8-2, the error spatial orders $\delta$ and $\varepsilon$ are set to values other than 1, 2, 3, and 4.

Moreover, in Example 8-3 of FIG. 27, the axial double angle N is 24, the spatial order M of the excitation winding 22 is 15, and the spatial order $|M\pm N|$ of the first and second output windings 23 and 24 is 39 or 9 (note that, 39 is equivalent to 9). Therefore, in Example 8-3, the error spatial order $\delta=|M-|M\pm N||$ detected by each of the first and second output windings 23 and 24 is 24 and 6, and the error spatial order $\varepsilon=|\delta-M|$ to detect the spatial order $\delta$ is 9. That is, also in Example 8-3, the error spatial orders $\delta$ and $\varepsilon$ are set to values other than 1, 2, 3, and 4.

Thus, also in Examples 8-2 and 8-3, similarly to Example 8-1, the first and second output windings 23 and 24 do not pick up the error components of the first, second, third, and fourth orders, thereby being capable of reducing angle error of the rotation angle detector 1 with respect to noises of eccentricity, elliptical deformation, triangular deformation, quadrangular deformation, magnetic anisotropy, and the like of the detecting stator 2 or the detecting rotor 3.

In the rotation angle detector 1 as thus described, the error spatial order $\delta$ represented by $|M-|M\pm N||$ and the error spatial order $\varepsilon$ represented by $|\delta-M|$ are values other than 1, 2, 3 and 4. Thus, it is possible to prevent the first and second output windings 23 and 24 from detecting the respective error components of the first, second, third, and fourth orders. Accordingly, the angle error of the rotation angle detector 1 can be reduced with respect to noises of eccentricity, elliptical deformation, triangular deformation, quadrangular deformation, magnetic anisotropy, and the like of the detecting stator 2 or the detecting rotor 3, to thereby suppress an increase in detection error. Further, the excitation winding 22 is wound around every tooth 27, and hence it is possible to maximize the spatial order (number of pole pairs) M of the excitation winding 22 with respect to the number (namely, 2M) of teeth 27 of the detecting stator 2. With this, leakage of the magnetic flux, which is generated by the magnetomotive force of the excitation winding 22, between the teeth 27 can be suppressed, to thereby improve output of the rotation angle detector 1. Accordingly, in the rotating electrical machine 101 using the rotation angle detector 1, it is possible to increase the accuracy in terms of controlling the position and speed of the rotor 103.

Ninth Embodiment

Figure 28:
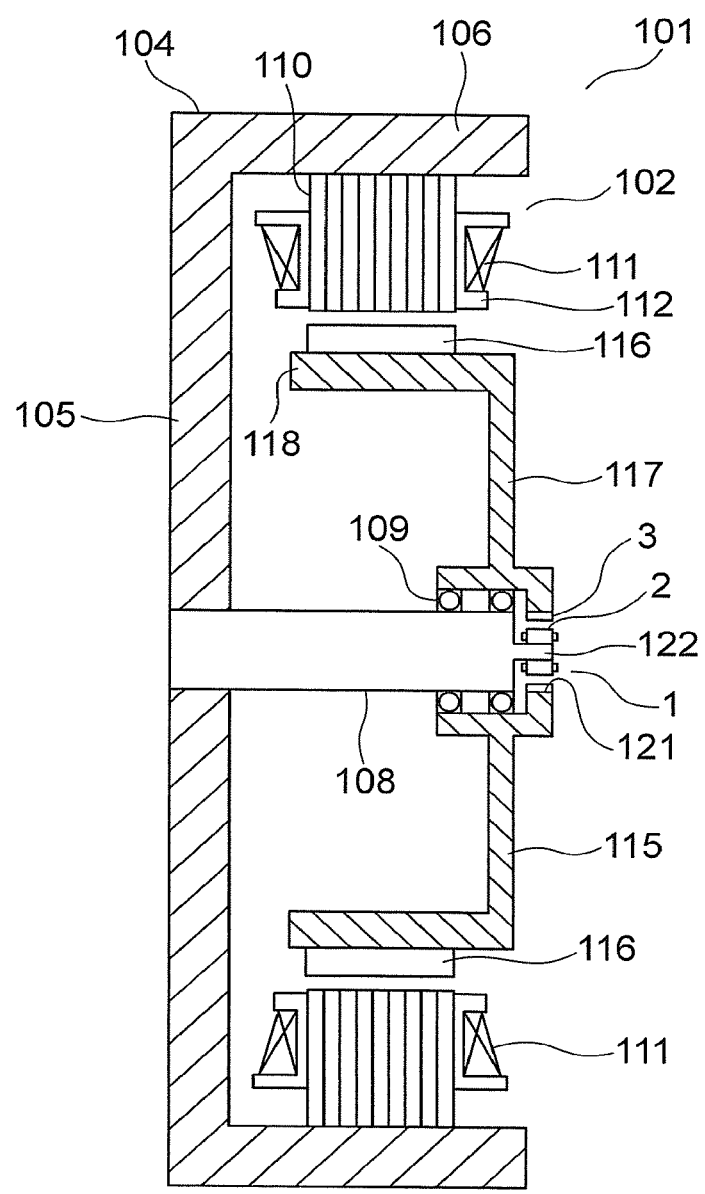
FIG. 28 is a longitudinal sectional view for illustrating a rotating electrical machine according to a ninth embodiment of the present invention.

FIG. 28 is a longitudinal sectional view for illustrating the rotating electrical machine 101 according to a ninth embodiment of the present invention. The rotor yoke 115 includes the rotor yoke body 117 having the bearing 109 mounted thereto, and the cylindrical rotor cylinder part 118 fixed to the outer peripheral part of the rotor yoke body 117 and arranged coaxially with the support shaft 108. A through hole 121 is formed in a central part of the rotor yoke body 117. A detector shaft 122 that reaches the inside of the through hole 121 is provided coaxially with the support shaft 108 at the distal end of the support shaft 108. An outer diameter of the detector shaft 122 is smaller than an outer diameter of the support shaft 108.

In the through hole 121 of the rotor yoke body 117, the rotation angle detector 1 configured to detect a rotation angle of the rotor 103 is provided. The rotation angle detector 1 includes the detecting stator 2 fixed to the detector shaft 122, and the detecting rotor 3 that is a magnetic body opposed to the detecting stator 2 in the radial direction and rotatable with respect to the detecting stator 2. In this example, the detecting rotor 3 has an annular shape, and the detecting stator 2 is arranged radially inside the detecting rotor 3. Further, in this example, the detecting rotor 3 is fixed to the inside of the through hole 121 of the rotor yoke body 117, and the detecting rotor 3 is rotated integrally with the rotor yoke body 117. The other configurations of the rotating electrical machine 101 are similar to those in the first embodiment.

Figure 29:
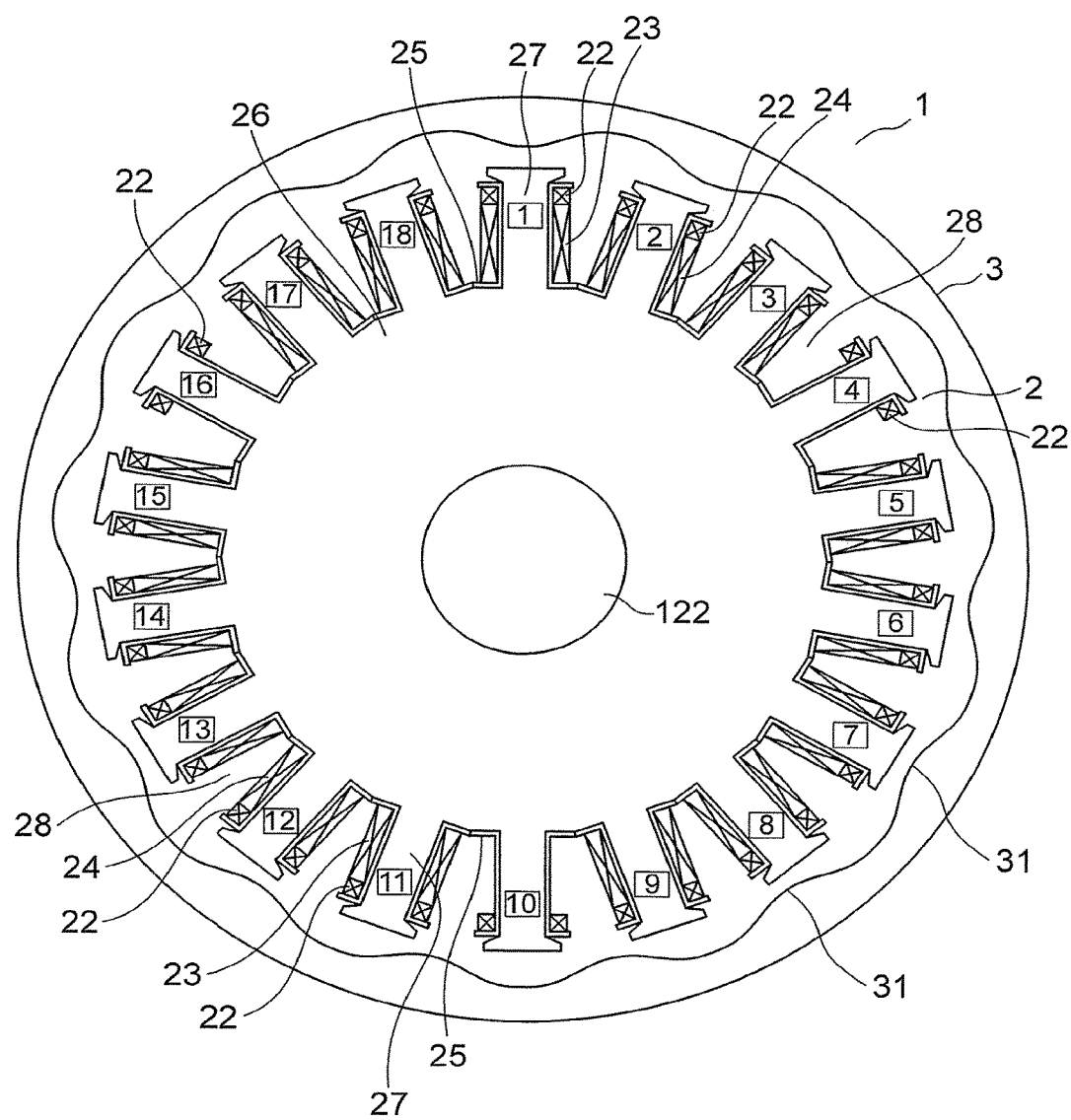
FIG. 29 is a sectional view for illustrating a rotation angle detector of FIG. 28.

FIG. 29 is a sectional view for illustrating the rotation angle detector 1 of FIG. 28. The detecting stator 2 includes: the detecting stator core 21 that is a magnetic body; the plurality of excitation windings 22, the plurality of first output windings 23, and the plurality of second output windings 24 that are each provided on the detecting stator core 21; and the insulating body 25 provided on the detecting stator core 21 and interposed between the detecting stator core 21 and each of the excitation windings 22, the first output windings 23, and the second output windings 24. An insulating state between the detecting stator core 21 and each of the excitation windings 22, the first output windings 23, and the second output windings 24 is ensured by the insulating body 25.

The detecting stator core 21 includes the core back 26 having the central part fitted onto (fixed to) the detector shaft 122, and the plurality of teeth 27 each projecting radially outward from the core back 26 and arrayed in the circumferential direction of the detecting stator core 21. In this example, eighteen teeth 27 are arrayed at regular intervals in the circumferential direction of the detecting stator core 21.

The excitation winding 22 is wound around each tooth 27. The respective excitation windings 22 are electrically connected in series to each other.

The first output winding (COS winding) 23 and the second output winding (SIN winding) 24 are output windings with mutually different phases. The respective first output windings 23 are electrically connected in series to each other, and the respective second output windings 24 are also electrically connected in series to each other. Further, the first output winding 23 and the second output winding 24 are wound around mutually different teeth 27, while avoiding winding of the output windings 23 and 24 with the same phase around two teeth 27 adjacent to each other in the circumferential direction of the detecting stator core 21. In this example, the first output windings 23 are respectively wound around a plurality of teeth 27 alternately selected in the circumferential direction out of the plurality of teeth 27, and the second output windings 24 are respectively wound around a plurality of teeth 27 different from the teeth 27 having the first output windings 23 wound therearound.

The excitation winding 22 and the first output winding 23 provided on the common tooth 27 are arrayed in the radial direction of the detecting rotor 3. Further, the excitation winding 22 is provided in a position closer to the detecting rotor 3 than the first output winding 23 is in the radial direction of the detecting rotor 3. That is, the conductive wire of the excitation winding 22 is wound around the distal end of the tooth 27 which is close to the detecting rotor 3, and the conductive wire of the first output winding 23 is wound around a portion of the tooth 27 which is closer to the core back 26 than the excitation winding 22 is.

Similarly, the first output winding 23 provided on another tooth 27 is provided on the inner side of the excitation winding 22 in the radial direction of the detecting rotor 3. Further, similarly, the second output winding 24 provided on each tooth 27 is provided on the inner side of the excitation winding 22 in the radial direction of the detecting rotor 3.

The detecting rotor 3 includes the plurality of salient poles 31 arrayed in the circumferential direction of the detecting rotor 3. Further, the detecting rotor 3 is rotatable with respect to the detecting stator 2, while each salient pole 31 is opposed to the outer peripheral surface of the detecting stator 2 in the radial direction. When the detecting rotor 3 is rotated with respect to the detecting stator 2, a pulsation of permeance between the detecting rotor 3 and the detecting stator 2 changes in a sine-wave shape due to existence of each salient pole 31.

AC power is supplied to each excitation winding 22, to thereby generate magnetomotive force in each excitation winding 22. With this, a magnetic flux passing through the detecting rotor 3 and the detecting stator core 21 is generated. This magnetic flux interlinks the first and second output windings 23 and 24, to thereby generate a voltage in each of the first and second output windings 23 and 24. The permeance between the detecting rotor 3 and the detecting stator 2 changes in the sine-wave shape in accordance with the rotation angle of the detecting rotor 3, and hence the rotation angle of the detecting rotor 3 is detected by measuring a voltage output from each of the first output winding 23 and the second output winding 24. The other configurations are similar to those in the second embodiment.

That is, the ninth embodiment is similar to the second embodiment except that the detecting stator 2 is radially inside the detecting rotor 3 and that the excitation winding 22 is provided radially outside the first and second output windings 23 and 24.

An effect similar to that of the second embodiment can be obtained also by providing the detecting stator 2 radially inside the detecting rotor 3 as thus described.

Further, each tooth 27 projects radially outward from the core back 26, and hence a width of an opening of the slot 28 formed between adjacent teeth 27 can be increased as compared to that in the first embodiment, to thereby facilitate operation to wind the conductive wire of each of the excitation winding 22, the first output winding 23, and the second output winding 24 around the tooth 27.

Further, the detecting rotor 3 is fixed to the rotor yoke body 117 to eliminate the need for forming the structure in which the detector shaft 119 passes through the hollow support shaft 108 as in the first embodiment, thereby being capable of simplifying the structure of the rotating electrical machine 101. With this, the cost can be reduced.

Tenth Embodiment

The rotation angle detector 1 and the rotating electrical machine 101 according to the above-mentioned first to ninth embodiments may be applied to an elevator hoisting machine.

Figure 30:
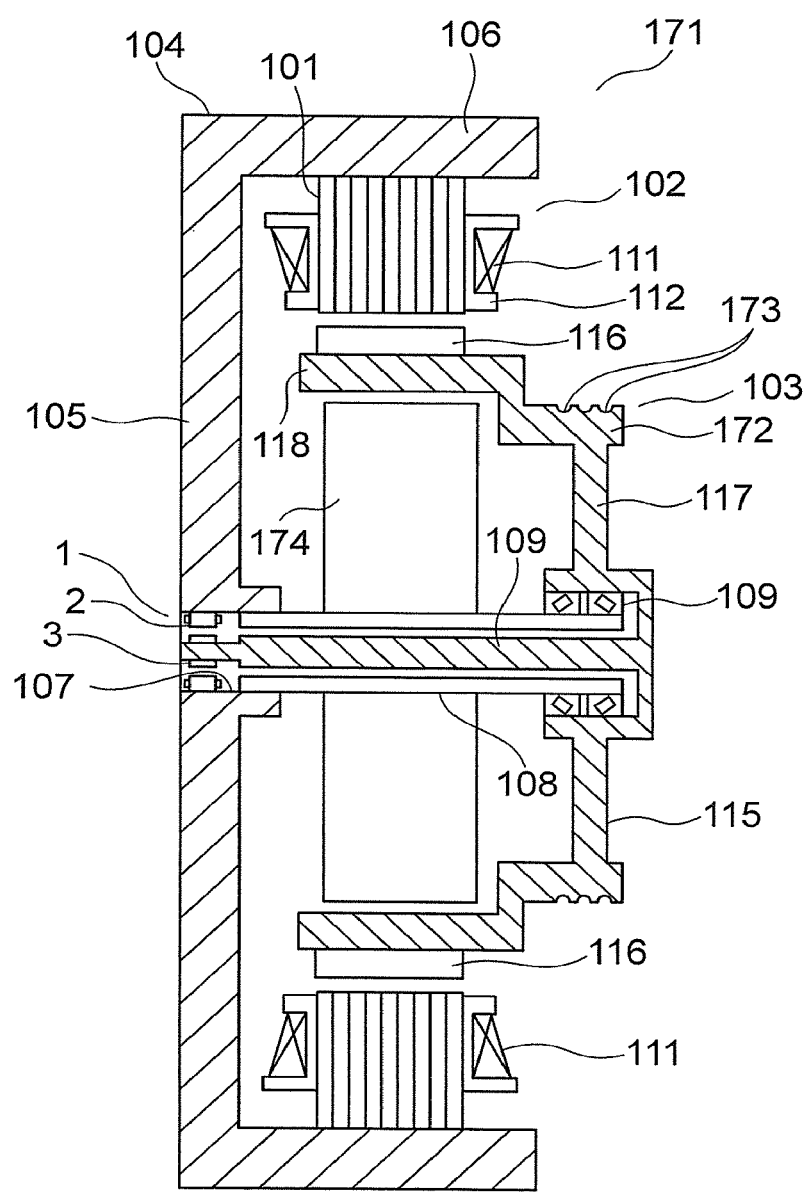
FIG. 30 is a longitudinal sectional view for illustrating an elevator hoisting machine, which has the rotation angle detector and the rotating electrical machine applied thereto, according to a tenth embodiment of the present invention.

That is, FIG. 30 is a longitudinal sectional view for illustrating an elevator hoisting machine, which has the rotation angle detector 1 and the rotating electrical machine 101 applied thereto, according to a tenth embodiment of the present invention. In FIG. 30, the elevator hoisting machine includes the rotation angle detector 1 similar to that of the first embodiment, a motor 171 being a rotating electrical machine, and a drive sheave 172 to be rotated by drive force of the motor 171.

The drive sheave 172 is rotatably supported by the support shaft 108 through intermediation of the bearing 109. The drive sheave 172 is molded integrally with the rotor yoke 115. In this example, a material for forming the drive sheave 172 and the rotor yoke 115 is cast iron. The drive sheave 172 is provided in a position away from the range of the stator 102 in the axial direction of the support shaft 108. The drive sheave 172 and the rotor 103 are integrally rotated about the axis line of the support shaft 108 by power distribution to each stator coil 111. In the outer peripheral surface of the drive sheave 172, a plurality of main rope grooves 173 are formed along the circumferential direction of the drive sheave 172.

A plurality of main ropes configured to hang a car and a counterweight (neither is shown) are wound and hung around the drive sheave 172 along the respective main rope grooves 173. The car and the counterweight are raised and lowered in a hoist way by rotation of the drive sheave 172.

A brake device 174 configured to apply braking force to the drive sheave 172 and the rotor 103 is provided inside the rotor cylinder part 118. The brake device 174 includes a brake shoe (not shown) displaceable in the radial direction of the rotor 103 with respect to the rotor cylinder part 118. The brake device 174 is configured to apply breaking force to the drive sheave 172 and the rotor 103 by bringing the brake shoe into contact with the inner peripheral surface of the rotor cylinder part 118, and the brake device 174 is configured to cancel the breaking force to the drive sheave 172 and the rotor 103 by separating the brake shoe from the rotor cylinder part 118.

In such an elevator hoisting machine, the rotating electrical machine 101 according to the first embodiment is used as the motor 171, and the rotation angle detector 1 according to the first embodiment is used for the motor 171. Thus, it is possible to obtain an effect similar to that of the first embodiment. That is, it is possible to obtain the elevator hoisting machine capable of enhancing the accuracy in terms of controlling the position and the speed of the rotor 103, and capable of decreasing the torque pulsation.

Note that, although the rotating electrical machine 101 similar to that of the first embodiment serves as the motor 171 of the hoisting machine in the above example, the rotating electrical machine 101 using the rotation angle detector 1 similar to that of any one of the second to ninth embodiments may serve as the motor 171 of the hoisting machine.

Further, although the present invention has been applied to the inner rotor type rotating electrical machine in which the annular stator 102 surrounds the outer periphery of the rotor 103 in the first to ninth embodiments, the present invention may be applied to an outer rotor type rotating electrical machine in which the annular rotor 103 surrounds the outer periphery of the stator 102.

The invention claimed is:

1. A rotation angle detector, comprising:
a detecting stator comprising a detecting stator core, and a plurality of excitation windings, a first output winding, and a second output winding that are each provided on the detecting stator core; and
a detecting rotor comprising a plurality of salient poles arrayed in a circumferential direction, and being rotatable with respect to the detecting stator, while each of the plurality of salient poles is opposed to the detecting stator in a radial direction, wherein:
the first output winding and the second output winding comprise output windings with mutually different phases;
the detecting stator core comprises a plurality of teeth arrayed in the circumferential direction;
each of the plurality of excitation windings is wound around each of the plurality of teeth;
the first output winding and the second output winding are wound around the teeth different from each other, while avoiding winding of the output windings with the same phase around two of the plurality of teeth which are adjacent to each other in the circumferential direction;
a number of pole pairs of the plurality of excitation windings is M that is an integer equal to or greater than 1;
a number of the plurality of salient poles is N that is an integer equal to or greater than 1;
a spatial distribution of a number of turns in each of the first output winding and the second output winding is obtained by a function represented by a sum of a function represented by a sine wave of a spatial order $|M\pm N|$, and a function represented by a sine wave of a spatial order $|M-|M\pm N||$ having an amplitude equal to an amplitude of the sine wave of the spatial order $|M\pm N|$; and
an error spatial order $\delta$ represented by $|M-|M\pm N||$ and an error spatial order c represented by $|\delta-M|$ are values other than 1 and 2.

2. A rotation angle detector according to claim 1, wherein the error spatial order $\delta$ and the error spatial order c are further values other than 4.

3. A rotation angle detector according to claim 1, wherein, on a common tooth having the excitation winding and the output winding wound therearound, one of the excitation winding and the output winding is provided in a position closer to the detecting rotor than another one of the excitation winding and the output winding is in the radial direction.

4. A rotation angle detector according to claim 1, wherein:
the detecting stator further comprises an insulating body interposed between the each of the plurality of teeth and each of the plurality of excitation windings and the output windings; and
the insulating body comprises a partition part configured to partition between the each of the plurality of excitation windings and each of the output windings in the radial direction.

5. A rotation angle detector according to claim 1, wherein:
the detecting stator further comprises an insulating body interposed between the each of the plurality of teeth and each of the plurality of excitation windings and the output winding;

the each of the plurality of excitation windings is provided only in part of a range of corresponding one of the output windings in the radial direction;
each of the output windings is wound around corresponding one of the plurality of teeth while covering an outer periphery of corresponding one of the plurality of excitation windings; and
the insulating body has formed therein a recess into which the corresponding one of the plurality of excitation windings is to be fitted.

6. A rotation angle detector according to claim 1, wherein respective positions of a plurality of the first output windings with mutually different numbers of turns are different from each other in the radial direction.

7. A rotation angle detector according to claim 6, wherein the respective positions of the plurality of the first output windings with mutually different numbers of turns are different from each other in the radial direction by adjusting the position of the first output winding with a smallest number of turns.

8. A rotation angle detector according to claim 1, wherein, the plurality of teeth comprise a tooth prevented from having the first output winding and the second output winding wound therearound.

9. A rotating electrical machine, comprising:
a stator;
a rotor to be rotated with respect to the stator; and
the rotation angle detector of claim 1 in which the detecting rotor is rotated integrally with the rotor.

10. An elevator hoisting machine, comprising:
a motor comprising the rotating electrical machine of claim 9, and
a drive sheave to be rotated by drive force of the motor.

11. A rotation angle detector, comprising:
a detecting stator comprising a detecting stator core, and a plurality of excitation windings, a first output winding, and a second output winding that are each provided on the detecting stator core; and
a detecting rotor comprising a plurality of salient poles arrayed in a circumferential direction, and being rotatable with respect to the detecting stator, while each of the plurality of salient poles is opposed to the detecting stator in a radial direction, wherein:
the first output winding and the second output winding comprise output windings with mutually different phases;
the detecting stator core comprises a plurality of teeth arrayed in the circumferential direction;
each of the plurality of excitation windings is wound around each of the plurality of teeth;
the first output winding and the second output winding are wound around the teeth different from each other, while avoiding winding of the output windings with the same phase around two of the plurality of teeth which are adjacent to each other in the circumferential direction;
a number of pole pairs of the plurality of excitation windings is M that is an integer equal to or greater than 1;
a number of the plurality of salient poles is N that is an integer equal to or greater than 1;
a spatial distribution of a number of turns in each of the first output winding and the second output winding is obtained by a function represented by a sine wave of a spatial order $|M\pm N|$;
an error spatial order represented by $|M-|M\pm N||$ and an error spatial order $\varepsilon$ represented by $|\delta-M|$ are values other than 1 and 2;

the number M of pole pairs of the plurality of excitation windings is 9; and the number N of the plurality of salient poles is any one of 15, 24, and 30.

12. A rotating electrical machine, comprising:
a stator;
a rotor to be rotated with respect to the stator; and
the rotation angle detector of claim 11 in which the detecting rotor is rotated integrally with the rotor.

13. An elevator hoisting machine, comprising:
a motor comprising the rotating electrical machine of claim 12, and
a drive sheave to be rotated by drive force of the motor.

14. A rotation angle detector, comprising:
a detecting stator comprising a detecting stator core, and a plurality of excitation windings, a first output winding, and a second output winding that are each provided on the detecting stator core; and
a detecting rotor comprising a plurality of salient poles arrayed in a circumferential direction, and being rotatable with respect to the detecting stator, while each of the plurality of salient poles is opposed to the detecting stator in a radial direction, wherein:
the first output winding and the second output winding comprise output windings with mutually different phases;
the detecting stator core comprises a plurality of teeth arrayed in the circumferential direction;
each of the plurality of excitation windings is wound around each of the plurality of teeth;
the first output winding and the second output winding are wound around the teeth different from each other, while avoiding winding of the output windings with the same phase around two of the plurality of teeth which are adjacent to each other in the circumferential direction;
a number of pole pairs of the plurality of excitation windings is M that is an integer equal to or greater than 1;
a number of the plurality of salient poles is N that is an integer equal to or greater than 1;
a spatial distribution of a number of turns in each of the first output winding and the second output winding is obtained by a function represented by a sine wave of a spatial order $|M\pm N|$;
an error spatial order $\delta$ represented by $|M-|M\pm N||$ and an error spatial order c represented by $|\delta-M|$ are values other than 1 and 2;
the number M of pole pairs of the plurality of excitation windings is 15; and
the number N of the plurality of salient poles is any one of 10, 20, and 24.

15. A rotating electrical machine, comprising:
a stator;
a rotor to be rotated with respect to the stator; and
the rotation angle detector of claim 14 in which the detecting rotor is rotated integrally with the rotor.

16. An elevator hoisting machine, comprising:
a motor comprising the rotating electrical machine of claim 15, and
a drive sheave to be rotated by drive force of the motor.

* * * * *